(12) United States Patent
Zhang et al.

(10) Patent No.: US 12,520,241 B2
(45) Date of Patent: Jan. 6, 2026

(54) COMMUNICATION METHOD AND APPARATUS

(71) Applicant: HUAWEI TECHNOLOGIES CO., LTD., Guangdong (CN)

(72) Inventors: Liangliang Zhang, Beijing (CN); Xizeng Dai, Beijing (CN); Jianghua Liu, Beijing (CN); Lili Zhang, Beijing (CN)

(73) Assignee: Huawei Technologies Co., LTD., Shenzhen (CN)

( * ) Notice: Subject to any disclaimer, the term of this patent is extended or adjusted under 35 U.S.C. 154(b) by 378 days.

(21) Appl. No.: 18/173,638

(22) Filed: Feb. 23, 2023

(65) Prior Publication Data
US 2023/0199667 A1  Jun. 22, 2023

Related U.S. Application Data

(63) Continuation of application No. PCT/CN2020/111535, filed on Aug. 26, 2020.

(51) Int. Cl.
*H04W 52/14*  (2009.01)
*H04W 72/1268*  (2023.01)

(52) U.S. Cl.
CPC ..... *H04W 52/146* (2013.01); *H04W 72/1268* (2013.01)

(58) Field of Classification Search
CPC ........... H04W 52/146; H04W 72/1268; H04W 72/1263; H04W 72/12; H04W 52/04; H04W 52/32
See application file for complete search history.

(56) References Cited

U.S. PATENT DOCUMENTS

2015/0215793 A1\* 7/2015 Siomina ................ H04W 64/00
                                                                  455/456.1
2022/0191839 A1\* 6/2022 Ying ..................... H04W 72/23

FOREIGN PATENT DOCUMENTS

CN   111050390 A    4/2020
JP   2013516809 A   5/2013

OTHER PUBLICATIONS

Huawei et al.: "Resolving remaining issues for UE switching between 1Tx carrier and 2Tx carrier", 3GPP Draft; R4-2006943, 3rd Generation Partnership Project (8GPP), RAN WG4, Online; May 25, 2020-Jun. 5, 2020 May 15, 2020 (May 15, 2020), XP051883950. (Year: 2020).\*
Apple et al., "Remaining issues on UL switching," 3GPP TSG-RAN WG2 Meeting #111-e, R2-2007085, Electronic, Aug. 17-28, 2020, 3 pages.
Extended European Search Report in European Appln No. 20950692.2, dated Sep. 4, 2023, 11 pages.

(Continued)

*Primary Examiner* — John J Lee
(74) *Attorney, Agent, or Firm* — Fish & Richardson P.C.

(57) ABSTRACT

A communication method and an apparatus are provided. The method includes: A terminal device receives first information from a network device, where the first information is for indicating an antenna port configuration used by an uplink carrier; and the terminal device determines statuses of L transmitters in the terminal device based on the antenna port configuration, where L is an integer greater than 0.

20 Claims, 4 Drawing Sheets

(56) References Cited

OTHER PUBLICATIONS

Huawei et al., "Resolving remaining issues for UE switching between 1Tx carrier and 2Tx carrier," 3GPP TSG RAN WG4 #95_e, R4-2006943, Online, May 25-Jun. 5, 2020, 5 pages.

Huawei et al., "Discussion on the remaining issues of supporting Tx switching between two uplink carriers, " 3GPP TSG RAN WG1 #100b_e, R1-2002661, E-meeting, Apr. 20-30, 2020, 21 pages.

Office Action in Japanese Appln. No. 2023-513320, mailed on Mar. 5, 2024, 13 pages (with English translation).

Office Action in Indian Appln. No. 202327011766, mailed on Feb. 1, 2024, 7 pages (with English translation).

\* cited by examiner

COMMUNICATION METHOD AND APPARATUS

CROSS-REFERENCE TO RELATED APPLICATIONS

This application is a continuation of International Application No. PCT/CN2020/111535, filed on Aug. 26, 2020, the disclosure of which is hereby incorporated by reference in its entirety.

TECHNICAL FIELD

This application relates to the field of wireless communication technologies, and in particular, to a communication method and an apparatus.

BACKGROUND

When scheduling a terminal device to send data, a network device may clearly indicate an antenna port used for sending the data, but does not indicate transmitters used by the terminal device to send the data. When more uplink carriers are configured for the terminal device than downlink carriers, a same antenna port configuration may correspond to a plurality of transmitter configurations. When the network device indicates the antenna port configuration to the terminal device, the network device cannot learn transmitters used by the terminal device to send the data.

A switching time is required when the terminal device switches to different transmitters, and different transmitters correspond to different switching times. A longer switching time of the transmitter indicates more occupied uplink sending opportunities. If the network device can know statuses of transmitters of the terminal device, that is, transmitters used by the terminal device during each carrier scheduling, the network device may more flexibly and comprehensively consider an antenna port configuration, so that the terminal device can obtain more uplink sending opportunities.

SUMMARY

An objective of this application is to provide a communication method and an apparatus, to indicate a transmitter configuration to a terminal device.

According to a first aspect, this application provides a communication method, including: receiving, by a terminal device, first information from a network device, where the first information is for indicating an antenna port configuration used by an uplink carrier; and determining, by the terminal device, statuses of L transmitters in the terminal device based on the antenna port configuration, where L is an integer greater than 0.

According to the foregoing method, the terminal device may determine the statuses of the L transmitters in the terminal device based on the first information, to determine whether transmitter switching needs to be performed before information is sent.

In a possible implementation, the determining, by the terminal device, statuses of L transmitters in the terminal device based on the antenna port configuration includes: determining, by the terminal device, at least one uplink carrier, where the at least one uplink carrier is for transmitting information or the at least one uplink carrier is an uplink carrier scheduled for use by the terminal device; determining, by the terminal device, an antenna port transmission configuration based on the at least one uplink carrier and the antenna port configuration, where the antenna port transmission configuration is for indicating an antenna port corresponding to the at least one uplink carrier; and determining, by the terminal device, the statuses of the L transmitters based on the antenna port transmission configuration.

In a possible implementation, the method further includes: if a first transmitter configuration is different from a second transmitter configuration, determining to perform transmitter configuration switching; or if a first transmitter configuration is different from a second transmitter configuration, determining to skip performing transmitter configuration switching, where the second transmitter configuration is statuses of the L transmitters when or before the terminal device receives the first information, and the first transmitter configuration is statuses of the L transmitters determined based on the antenna port configuration.

In a possible implementation, the antenna port transmission configuration corresponds to one or a plurality of transmitter configurations; and the determining, by the terminal device, the statuses of the L transmitters based on the antenna port transmission configuration includes: if the antenna port transmission configuration corresponds to only one transmitter configuration, determining the transmitter configuration corresponding to the antenna port transmission configuration as a first transmitter configuration; if the antenna port transmission configuration corresponds to a plurality of transmitter configurations, and the plurality of transmitter configurations include a second transmitter configuration, determining, by the terminal device, the second transmitter configuration as a first transmitter configuration; or if the antenna port transmission configuration corresponds to a plurality of transmitter configurations, and the plurality of transmitter configurations do not include a second transmitter configuration, selecting, by the terminal device, one transmitter configuration from the plurality of transmitter configurations corresponding to the antenna port transmission configuration as a first transmitter configuration, where the second transmitter configuration is a transmitter configuration used when or before the terminal device receives the first information.

According to the foregoing method, when determining that the antenna port transmission configuration corresponds to the second transmitter configuration, the terminal device preferentially keeps a current transmitter configuration unchanged. This can prevent the terminal device from frequently switching transmitters, thereby reducing a switching time, and enabling the terminal device to obtain more uplink sending opportunities.

In a possible implementation, the selecting, by the terminal device, one transmitter configuration from the plurality of transmitter configurations corresponding to the antenna port transmission configuration as a first transmitter configuration includes: determining, by the terminal device from at least one transmitter configuration in a preset sequence, a transmitter configuration that meets a condition, and using the transmitter configuration that meets the condition as the first transmitter configuration, where the at least one transmitter configuration is determined based on the L transmitters of the terminal device; and the transmitter configuration that meets the condition means that one or a plurality of antenna port configurations corresponding to the transmitter configuration include the antenna port transmission configuration.

In a possible implementation, the second transmitter configuration is located in a first group of transmitter configurations of N groups of transmitter configurations, and the first group of transmitter configurations includes at least one transmitter configuration; and the selecting, by the terminal device, one transmitter configuration from the plurality of transmitter configurations corresponding to the antenna port transmission configuration as a first transmitter configuration includes: if determining that a transmitter configuration that meets a condition exists in the first group of transmitter configurations, using, by the terminal device, the transmitter configuration that meets the condition as the first transmitter configuration; or if determining that a transmitter configuration that meets a condition does not exist in the first group of transmitter configurations, determining, by the terminal device from the N groups of transmitter configurations in a preset sequence, the transmitter configuration that meets the condition, and using the transmitter configuration that meets the condition as the first transmitter configuration, where the transmitter configuration that meets the condition means that one or a plurality of antenna port configurations corresponding to the transmitter configuration include the antenna port transmission configuration.

In a possible implementation, the method further includes: determining, by the terminal device based on the statuses of the L transmitters, a status of a transmitter corresponding to each of the at least one uplink carrier; and determining, based on the status of the transmitter corresponding to each of the at least one uplink carrier, at least one transmitter for transmitting information.

In a possible implementation, the method further includes: receiving, by the terminal device, third information from the network device, where the third information is for indicating the statuses of the L transmitters in the terminal device, and L is an integer greater than 0; or the third information is for indicating a status of a transmitter corresponding to each of at least one carrier in the terminal device;

sending, by the terminal device, fifth information to the network device, where the fifth information is for indicating the statuses of the L transmitters in the terminal device, and L is an integer greater than 0; or the fifth information is for indicating a status of a transmitter corresponding to each of at least one carrier in the terminal device; or setting, by the terminal device, the statuses of the L transmitters to pre-configured statuses.

In a possible implementation, the method further includes: receiving, by the terminal device, scheduling information from the network device, where the scheduling information is for indicating an index value of a first configuration combination, the first configuration combination is one of H pre-established configuration combinations, one of the H configuration combinations includes one antenna port transmission configuration and one transmitter configuration, and the H configuration combinations include all configuration combinations including antenna port transmission configurations and transmitter configurations that correspond to the terminal device.

In a possible implementation, the method further includes: sending, by the terminal device, capability information to the network device, where the capability information is for indicating one or more of the following:

the terminal device can determine, from more than L uplink carriers, an uplink carrier for sending information; or the terminal device can support determining, from a maximum of S uplink carriers, an uplink carrier for sending information, where S is a positive integer greater than L; and L.

In a possible implementation, the method further includes: receiving, by the terminal device, configuration information from the network device, where the configuration information is for indicating one or more of the following:

information about an uplink carrier configured by the network device for the terminal device;

information about an uplink carrier activated by the network device for the terminal device;

information about an uplink carrier used by the terminal device to transmit information;

a quantity X of uplink carriers configured by the network device for the terminal device, where X is a positive integer greater than L, and L is a maximum quantity of uplink carriers on which the terminal device can perform uplink transmission simultaneously;

a quantity X of uplink carriers configured by the network device for the terminal device, where X is a positive integer greater than P, P is a maximum quantity of transmitters on which the terminal device can perform uplink transmission simultaneously; or a quantity m of uplink carriers used by the terminal device to transmit information, where m is a positive integer less than or equal to L.

In a possible implementation, the method further includes: receiving, by the terminal device, first power information from the network device, where the first power information is for indicating that a transmit power of the at least one carrier is a first transmit power; and transmitting, by the terminal device, information on the at least one carrier by using the first transmit power.

In a possible implementation, before the terminal device receives the first power information from the network device, the method includes: sending, by the terminal device, second power information to the network device, where the second power information is for indicating that the terminal device supports information sending on one antenna port by using the first transmit power or a second transmit power, and the first transmit power is greater than the second transmit power; or sending, by the terminal device, second power information to the network device, where the second power information is for indicating that the terminal device supports information sending on one carrier by using the first transmit power or a second transmit power, and the first transmit power is greater than the second transmit power.

In a possible implementation, that the terminal device supports information sending on one antenna port by using the first transmit power includes: the terminal device supports information sending on one antenna port by using K transmitters and by using the first transmit power, where K is a positive integer.

In a possible implementation, the second power information includes at least one of the following parameters: a carrier frequency band using the first transmit power, a carrier frequency using the first transmit power, a carrier frequency index using the first transmit power, a carrier frequency identifier using the first transmit power, a quantity of antenna ports sending information by using the first transmit power, numbers of antenna ports sending information by using the first transmit power, a quantity of transmitters sending information by using the first transmit power, a quantity of multiple-input multiple-output MIMO layers sending information by using the first transmit power, and a power gain.

In a possible implementation, the transmitting, by the terminal device, information on the at least one carrier by using the first transmit power includes: transmitting, by the terminal device, information on the at least one carrier on one antenna port by using K transmitters and by using the first transmit power; or for an $i^{th}$ carrier in the at least one carrier, transmitting, by the terminal device, information on the $i^{th}$ carrier on one antenna port by using K transmitters and by using the first transmit power, where i is a positive integer.

According to a second aspect, this application provides a communication method, including: sending, by a network device, first information to a terminal device, where the first information is for indicating an antenna port configuration used by an uplink carrier; and determining, by the network device, statuses of L transmitters in the terminal device based on the antenna port configuration, where L is an integer greater than 0.

In a possible implementation, the method further includes: if a first transmitter configuration is different from a second transmitter configuration, determining to perform transmitter configuration switching; or if a first transmitter configuration is different from a second transmitter configuration, determining to skip performing transmitter configuration switching, where the second transmitter configuration is a status of a transmitter corresponding to each of at least one carrier when or before the terminal device receives the first information, and the first transmitter configuration is a status of the transmitter corresponding to each of the at least one carrier determined based on the antenna port configuration.

In a possible implementation, the method further includes: sending, by the terminal device, second power information to the network device, where the second power information is for indicating that the terminal device supports information sending on one antenna port by using a first transmit power or a second transmit power, and the first transmit power is greater than the second transmit power; or sending, by the terminal device, second power information to the network device, where the second power information is for indicating that the terminal device supports information sending on one carrier by using a first transmit power or a second transmit power, and the first transmit power is greater than the second transmit power.

According to a third aspect, this application provides a communication method, including: receiving, by a terminal device, third information from a network device, where the third information is for indicating statuses of L transmitters in the terminal device, and L is an integer greater than 0; and determining, by the terminal device based on the statuses of the L transmitters, at least one transmitter that is in the terminal device and that is for transmitting information.

According to the foregoing method, the terminal device may directly determine the statuses of the L transmitters in the terminal device based on the third information, to determine transmitters used to send information.

In a possible implementation, a status of a transmitter includes at least one of an enabled state and a disabled state.

In a possible implementation, the third information is for indicating that each of the L transmitters is in an enabled state or a disabled state; or the third information is for indicating a transmitter in an enabled state in the L transmitters; or the third information is for indicating a transmitter in a disabled state in the L transmitters; or the third information is for indicating a status of a transmitter corresponding to each of at least one carrier in the terminal device.

In a possible implementation, the method further includes: receiving, by the terminal device, second information from the network device, where the second information is for indicating information about an uplink carrier corresponding to each of the at least one transmitter, or the second information is for indicating information about at least one uplink carrier.

In a possible implementation, the determining, by the terminal device based on the statuses of the L transmitters, at least one transmitter that is in the terminal device and that is for transmitting information includes: determining, by the terminal device based on the third information, a transmitter in an enabled state in the L transmitters; and determining, by the terminal device based on the second information, a transmitter corresponding to each of the at least one uplink carrier, and determining the transmitter in the enabled state corresponding to the at least one uplink carrier as the at least one transmitter for transmitting information; or determining, by the terminal device based on the statuses of the L transmitters and the second information, a status of a transmitter corresponding to each of the at least one uplink carrier; and determining, by the terminal device, the at least one transmitter that is in the terminal device and that is for transmitting information.

In a possible implementation, the method further includes: receiving, by the terminal device, first information from the network device, where the first information is for indicating an antenna port configuration used by an uplink carrier; or the first information is for indicating an antenna port configuration used by each of X uplink carriers configured for the terminal device, and X is a positive integer.

In a possible implementation, the determining, by the terminal device based on the statuses of the L transmitters, at least one transmitter that is in the terminal device and that is for transmitting information includes: determining, by the terminal device based on the third information, a transmitter in an enabled state in the L transmitters; and determining, by the terminal device based on the first information, a transmitter corresponding to each of at least one antenna port, and determining the transmitter in the enabled state corresponding to the at least one antenna port as the at least one transmitter for transmitting information; or determining, by the terminal device based on the statuses of the L transmitters and the first information, a status of a transmitter corresponding to each antenna port of the at least one antenna port; and determining, by the terminal device, the at least one transmitter that is in the terminal device and that is for transmitting information.

In a possible implementation, the third information is further for indicating one or more of the following: a status of a transmitter used by an uplink carrier; and a quantity of transmitters used by the uplink carrier; or the third information is further for indicating one or more of the following: a status of a transmitter used by each of X uplink carriers; and a quantity of transmitters used by each of the X uplink carriers, where X is a positive integer.

In a possible implementation, the determining, by the terminal device based on the statuses of the L transmitters, at least one transmitter that is in the terminal device and that is for transmitting information includes: determining, by the terminal device, at least one transmitter that is in an enabled state and that is in the L transmitters as the at least one transmitter that is in the terminal device and that is for transmitting information; or determining, by the terminal device based on a status of a transmitter used by each of X uplink carriers, the at least one transmitter that is in the terminal device and that is for transmitting information.

In a possible implementation, the method further includes: receiving, by the terminal device, first power information from the network device, where the first power information is for indicating that a transmit power of at least one carrier is a first transmit power; and transmitting, by the terminal device, information on the at least one carrier by using the first transmit power.

In a possible implementation, before the terminal device receives the first power information from the network device, the method includes: sending, by the terminal device, second power information to the network device, where the second power information is for indicating that the terminal device supports information sending on one antenna port by using the first transmit power or a second transmit power, and the first transmit power is greater than the second transmit power; or sending, by the terminal device, second power information to the network device, where the second power information is for indicating that the terminal device supports information sending on one carrier by using the first transmit power or a second transmit power, and the first transmit power is greater than the second transmit power.

In a possible implementation, that the terminal device supports information sending on one antenna port by using the first transmit power includes: the terminal device supports information sending on one antenna port by using K transmitters and by using the first transmit power, where K is a positive integer.

In a possible implementation, the second power information includes at least one of the following parameters: a carrier frequency band using the first transmit power, a carrier frequency using the first transmit power, a carrier frequency index using the first transmit power, a carrier frequency identifier using the first transmit power, a quantity of antenna ports sending information by using the first transmit power, numbers of antenna ports sending information by using the first transmit power, a quantity of transmitters sending information by using the first transmit power, a quantity of multiple-input multiple-output MIMO layers sending information by using the first transmit power, and a power gain.

In a possible implementation, the transmitting, by the terminal device, information on the at least one carrier by using the first transmit power includes: transmitting, by the terminal device, information on the at least one carrier on one antenna port by using K transmitters and by using the first transmit power; or for an $i^{th}$ carrier in the at least one carrier, transmitting, by the terminal device, information on the $i^{th}$ carrier on one antenna port by using K transmitters and by using the first transmit power, where i is a positive integer.

According to a fourth aspect, this application provides a communication method, including: sending, by a network device, third information to a terminal device, where the third information is for indicating statuses of L transmitters in the terminal device, or the third information is for indicating a status of a transmitter corresponding to each of at least one carrier; and receiving, by the network device, information on the at least one carrier based on the status of the transmitter.

In a possible implementation, the network device sends first power information to the terminal device, where the first power information is for indicating that a transmit power of the at least one carrier is a first transmit power.

In a possible implementation, the network device receives second power information from the terminal device, where the second power information is for indicating that the terminal device supports information sending on one antenna port by using the first transmit power or a second transmit power, and the first transmit power is greater than the second transmit power; or the second power information is for indicating that the terminal device supports information sending on one carrier by using the first transmit power or a second transmit power.

According to a fifth aspect, this application provides a communication method, including: receiving, by a terminal device, third information from a network device, where the third information is for indicating a status of a transmitter corresponding to each of at least one carrier; and determining, by the terminal device based on the status of the transmitter corresponding to each of the at least one carrier, at least one transmitter that is in the terminal device and that is for transmitting information.

According to the foregoing method, the terminal device may determine, based on the third information, the status of the transmitter corresponding to each carrier, to determine statuses of L transmitters in the terminal device, and determine transmitters used to send information.

In a possible implementation, a status of a transmitter includes an enabled state and/or a disabled state.

In a possible implementation, the third information includes at least one of the following: a status of a transmitter used by an uplink carrier; and a quantity of transmitters used by the uplink carrier; or the third information includes at least one of the following: a status of a transmitter used by each of X uplink carriers; and a quantity of transmitters used by each of the X uplink carriers, where X is a positive integer.

In a possible implementation, the method further includes: if a first transmitter configuration is different from a second transmitter configuration, determining to perform transmitter configuration switching; or if a first transmitter configuration is different from a second transmitter configuration, determining to skip performing transmitter configuration switching, where the second transmitter configuration is a status of a transmitter corresponding to each of at least one carrier when or before the terminal device receives the first information, and the first transmitter configuration is a status of the transmitter corresponding to each of the at least one carrier determined based on an antenna port configuration.

In a possible implementation, the method further includes: receiving, by the terminal device, first power information from the network device, where the first power information is for indicating that a transmit power of the at least one carrier is a first transmit power; and transmitting, by the terminal device, information on the at least one carrier by using the first transmit power.

In a possible implementation, before the terminal device receives the first power information from the network device, the method includes: sending, by the terminal device, second power information to the network device, where the second power information is for indicating that the terminal device supports information sending on one antenna port by using the first transmit power or a second transmit power, and the first transmit power is greater than the second transmit power; or sending, by the terminal device, second power information to the network device, where the second power information is for indicating that the terminal device supports information sending on one carrier by using the first transmit power or a second transmit power, and the first transmit power is greater than the second transmit power.

In a possible implementation, that the terminal device supports information sending on one antenna port by using the first transmit power includes: the terminal device supports information sending on one antenna port by using K transmitters and by using the first transmit power, where K is a positive integer.

In a possible implementation, the second power information includes at least one of the following parameters: a carrier frequency band using the first transmit power, a carrier frequency using the first transmit power, a carrier frequency index using the first transmit power, a carrier frequency identifier using the first transmit power, a quantity of antenna ports sending information by using the first transmit power, numbers of antenna ports sending information by using the first transmit power, a quantity of transmitters sending information by using the first transmit power, a quantity of multiple-input multiple-output MIMO layers sending information by using the first transmit power, and a power gain.

In a possible implementation, the transmitting, by the terminal device, information on the at least one carrier by using the first transmit power includes: transmitting, by the terminal device, information on the at least one carrier on one antenna port by using K transmitters and by using the first transmit power; or for an $i^{th}$ carrier in the at least one carrier, transmitting, by the terminal device, information on the $i^{th}$ carrier on one antenna port by using K transmitters and by using the first transmit power, where i is a positive integer.

According to a sixth aspect, this application provides a communication method, including: receiving, by a terminal device, first power information from a network device, where the first power information is for indicating that a transmit power of at least one carrier is a first transmit power; and transmitting, by the terminal device, information on the at least one carrier by using the first transmit power.

In a possible implementation, before the terminal device receives the first power information from the network device, the method includes: sending, by the terminal device, second power information to the network device, where the second power information is for indicating that the terminal device supports information sending on one antenna port by using the first transmit power or a second transmit power, and the first transmit power is greater than the second transmit power; or sending, by the terminal device, second power information to the network device, where the second power information is for indicating that the terminal device supports information sending on one carrier by using the first transmit power or a second transmit power, and the first transmit power is greater than the second transmit power.

In a possible implementation, that the terminal device supports information sending on one antenna port by using the first transmit power includes: the terminal device supports information sending on one antenna port by using K transmitters and by using the first transmit power, where K is a positive integer.

In a possible implementation, the second power information includes at least one of the following parameters: a carrier frequency band using the first transmit power, a carrier frequency using the first transmit power, a carrier frequency index using the first transmit power, a carrier frequency identifier using the first transmit power, a quantity of antenna ports sending information by using the first transmit power, numbers of antenna ports sending information by using the first transmit power, a quantity of transmitters sending information by using the first transmit power, a quantity of multiple-input multiple-output MIMO layers sending information by using the first transmit power, and a power gain.

In a possible implementation, the transmitting, by the terminal device, information on the at least one carrier by using the first transmit power includes: transmitting, by the terminal device, information on the at least one carrier on one antenna port by using K transmitters and by using the first transmit power; or for an $i^{th}$ carrier in the at least one carrier, transmitting, by the terminal device, information on the $i^{th}$ carrier on one antenna port by using K transmitters and by using the first transmit power, where i is a positive integer.

According to a seventh aspect, this application provides a communication method, including: sending, by a terminal device, second power information to a network device, where the second power information is for indicating that the terminal device supports information sending on one antenna port by using a first transmit power or a second transmit power, and the first transmit power is greater than the second transmit power; or sending, by a terminal device, second power information to a network device, where the second power information is for indicating that the terminal device supports information sending on one carrier by using a first transmit power or a second transmit power, and the first transmit power is greater than the second transmit power.

In a possible implementation, that the terminal device supports information sending on one antenna port by using the first transmit power includes: the terminal device supports information sending on one antenna port by using K transmitters and by using the first transmit power, where K is a positive integer.

In a possible implementation, the second power information includes at least one of the following parameters: a carrier frequency band using the first transmit power, a carrier frequency using the first transmit power, a carrier frequency index using the first transmit power, a carrier frequency identifier using the first transmit power, a quantity of antenna ports sending information by using the first transmit power, numbers of antenna ports sending information by using the first transmit power, a quantity of transmitters sending information by using the first transmit power, a quantity of multiple-input multiple-output MIMO layers sending information by using the first transmit power, and a power gain.

In a possible implementation, the method further includes: receiving, by the terminal device, first power information from the network device, where the first power information is for indicating that a transmit power of at least one carrier is a first transmit power; and transmitting, by the terminal device, information on the at least one carrier by using the first transmit power.

In a possible implementation, the transmitting, by the terminal device, information on the at least one carrier by using the first transmit power includes: transmitting, by the terminal device, information on the at least one carrier on one antenna port by using K transmitters and by using the first transmit power; or for an $i^{th}$ carrier in the at least one carrier, transmitting, by the terminal device, information on the $i^{th}$ carrier on one antenna port by using K transmitters and by using the first transmit power, where i is a positive integer.

According to an eighth aspect, this application further provides a communication apparatus. The communication apparatus can implement any method provided in any one of the first aspect to the seventh aspect. The communication apparatus may be implemented by hardware, or may be implemented by hardware executing corresponding software. The hardware or the software includes one or more units or modules corresponding to the functions.

In a possible implementation, the communication apparatus includes a processor. The processor is configured to support the communication apparatus in performing a corresponding function of the terminal device in the method provided in any one of the foregoing aspects. The communication apparatus may further include a memory. The memory may be coupled to the processor, and the memory stores program instructions and data that are necessary for the communication apparatus. Optionally, the communication apparatus further includes a communication interface, and the communication interface is configured to support communication between the communication apparatus and a device such as a network device.

In a possible implementation, the communication apparatus includes a processor. The processor is configured to support the communication apparatus in performing a corresponding function of the network device in the method provided in any one of the foregoing aspects. The communication apparatus may further include a memory. The memory may be coupled to the processor, and the memory stores program instructions and data that are necessary for the communication apparatus. Optionally, the communication apparatus further includes a communication interface, and the communication interface is configured to support communication between the communication apparatus and a device such as a terminal device.

In a possible implementation, the communication apparatus includes corresponding functional units, configured to implement the steps in the foregoing methods. Functions may be implemented by hardware, or may be implemented by hardware executing corresponding software. The hardware or the software includes one or more units corresponding to the functions.

In a possible implementation, a structure of the communication apparatus includes a processing unit and a communication unit. These units may perform corresponding functions in the foregoing method examples. For details, refer to the descriptions in the method according to the first aspect. Details are not described herein again.

According to a ninth aspect, this application provides a communication apparatus. The communication apparatus includes a processor. When the processor executes a computer program or instructions in a memory, the method according to the first aspect is performed.

According to a tenth aspect, this application provides a communication apparatus. The communication apparatus includes a processor and a memory, where the memory is configured to store a computer program or instructions, and the processor is configured to execute the computer program or the instructions stored in the memory, to cause the communication apparatus to perform any method provided in any one of the first aspect to the seventh aspect.

According to an eleventh aspect, this application provides a communication apparatus. The communication apparatus includes a processor, a memory, and a communication interface, where the communication interface is configured to receive a signal or send a signal; the memory is configured to store a computer program or instructions; and the processor is configured to invoke the computer program or the instructions from the memory to perform any method provided in any one of the first aspect to the seventh aspect.

According to a twelfth aspect, this application provides a communication apparatus. The communication apparatus includes a processor and a communication interface, where the communication interface is configured to receive code instructions and transmit the code instructions to the processor, and the processor runs the code instructions to perform any method provided in any one of the first aspect to the seventh aspect.

According to a thirteenth aspect, this application provides a computer-readable storage medium, where the computer-readable storage medium is configured to store a computer program or instructions, and when a computer reads and executes the computer program or the instructions, any method provided in any one of the first aspect to the seventh aspect is implemented.

According to a fourteenth aspect, this application provides a computer program product including instructions. When a computer reads and executes the computer program product, any method provided in any one of the first aspect to the seventh aspect is implemented.

According to a fifteenth aspect, this application provides a chip, including a processor. The processor is coupled to a memory, and is configured to execute a computer program or instructions stored in the memory. When the processor executes the computer program or the instructions, any method provided in any one of the first aspect to the seventh aspect is implemented.

DESCRIPTION OF EMBODIMENTS

The following further describes embodiments of this application in detail with reference to the accompanying drawings.

Technical solutions in embodiments of this application are applicable to various communication systems, for example, a new radio (new radio, NR) system, a long term evolution (long term evolution, LTE) system, an LTE frequency division duplex (frequency division duplex, FDD) system, and an LTE time division duplex (time division duplex, TDD) system. This is not limited herein.

A terminal device in embodiments of this application may be a device having a wireless transceiver function or a chip that can be disposed in any device, or may be referred to as user equipment (user equipment, UE), an access terminal, a subscriber unit, a subscriber station, a mobile station, a mobile console, a remote station, a remote terminal, a mobile device, a user terminal, a wireless communication device, a user agent, or a user apparatus. The terminal device in embodiments of this application may be a mobile phone (mobile phone), a pad (Pad), a computer having a wireless transceiver function, a virtual reality (virtual reality, VR) terminal, an augmented reality (augmented reality, AR) terminal, a wireless terminal in industrial control (industrial control), a wireless terminal in self-driving (self-driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like.

A network device may be a next generation NodeB (next generation NodeB, gNB) in an NR system, may be an evolved NodeB (evolved NodeB, eNB) in an LTE system, may be a base transceiver station (base transceiver station, BTS) in a global system for mobile communications (global system for mobile communications, GSM) system or a code division multiple access (code division multiple access, CDMA) system, may be a NodeB (NodeB, NB) in a wideband code division multiple access (wideband code division multiple access, WCDMA) system, or the like.

Figure 1:
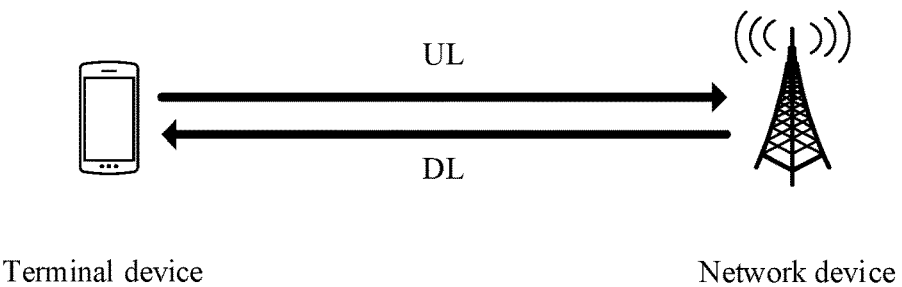
FIG. 1 is a schematic diagram of a network architecture to which an embodiment of this application is applicable.

For ease of understanding embodiments of this application, a communication system shown in FIG. 1 is first used as an example to describe in detail a communication system to which an embodiment of this application is applicable. FIG. 1 is a schematic diagram of a structure of a wireless communication system to which an embodiment of this application is applicable. As shown in FIG. 1, the wireless communication system includes a terminal device and a network device. Depending on different transmission directions, a transmission link from the terminal device to the network device is denoted as an uplink (uplink, UL), and a transmission link from the network device to the terminal device is denoted as a downlink (downlink, DL). Similarly, data transmission in the uplink may be briefly denoted as uplink data transmission or uplink transmission, and data transmission in the downlink may be briefly denoted as downlink data transmission or downlink transmission.

It should be noted that an architecture of the communication system shown in FIG. 1 is not limited to including only the devices shown in the figure, and may further include another device not shown in the figure. Details are not described herein in this application one by one.

The following first provides definitions of technical terms that may appear in embodiments of this application.

A transmitter (transmitter, TX) is a physical concept, and may also be referred to as a radio frequency (radio frequency, RF) transmitter. In this application, the transmitter is referred to as a transmitter for short. In this application, the transmitter may work in the following manner, but is not limited to the following manner: The transmitter may receive a baseband signal from a baseband chip, perform radio frequency processing (such as up-conversion, amplification, and filtering) on the baseband signal to obtain a radio frequency signal, and finally radiate the radio frequency signal to space by using an antenna. Specifically, the transmitter may include electronic components such as an antenna switch, an antenna tuner, a low noise amplifier (low noise amplifier, LNA), a power amplifier (power amplifier, PA), a frequency mixer (mixer), a local oscillator (local oscillator, LO), and a filter (filter). These electronic components may be integrated into one or more chips as required. Sometimes, the antenna may also be considered as a part of the transmitter.

An antenna port (port) is a logical concept. During actual signal sending, antenna ports are mapped to corresponding transmitters. Currently, when scheduling the terminal device to transmit data, the network device may clearly indicate a port number of an antenna port used for transmitting the data.

A component carrier (component carrier, CC) is a frequency domain resource for carrying information output by a transmitter. The component carrier is sometimes also translated into a component carrier, which may be referred to as a carrier for short. The network device may configure a plurality of uplink carriers and a plurality of downlink carriers for the terminal device. In this application, a quantity of the uplink carriers configured by the network device may be greater than a quantity of the downlink carriers.

It is assumed that the terminal device sends data on an uplink carrier CC1 by using one transmitter. In this case, the transmitter needs to adapt to a frequency of the CC1. When the terminal device switches to an uplink carrier CC2, the transmitter also needs to adapt to a frequency of the CC2. Because frequencies of the CC1 and the CC2 are different, it takes a specific time to readjust a frequency adapted to a transmitter of the terminal device from one frequency to another frequency, and the time may be denoted as a switching time (TX switching time), a radio frequency retuning time (RF retuning time), or the like. For ease of description, the time is collectively referred to as a switching time below. The switching time is related to software and hardware configurations of the terminal device.

In a transmitter switching process, data transmission may be interrupted. As described above, an interruption time of the data transmission includes the switching time. Therefore, reducing the switching time can reduce an interruption time of data transmission, thereby helping improve system performance.

A network architecture and a service scenario described in embodiments of this application are intended to describe the technical solutions in embodiments of this application more clearly, and do not constitute any limitation on the technical solutions provided in embodiments of this application. A person of ordinary skill in the art may know that with evolution of the network architecture and emergence of a new service scenario, the technical solutions provided in embodiments of this application are also applicable to similar technical problems.

In embodiments of this application, interaction between the terminal device and the network device is used as an example for description. The method provided in embodiments of this application may be further applicable to interaction between other execution bodies, for example, interaction between a chip or a module in the terminal device and a chip or a module in the network device. When an execution body is a chip or a module, refer to the descriptions in embodiments of this application. Details are not described herein again.

In embodiments of this application, before the network device configures an uplink carrier for the terminal device, the terminal device may send capability information to the network device. The capability information is for indicating one or more of the following:

the terminal device can determine, from more than L uplink carriers, an uplink carrier for sending information, where L is an integer greater than 0; and the terminal device can support determining, from a maximum of S uplink carriers, an uplink carrier for sending information, where S is a positive integer greater than L; and

L.

Correspondingly, the network device may send configuration information to the terminal device, where the configuration information is for indicating one or more of the following:

information about an uplink carrier configured by the network device for the terminal device;

information about an uplink carrier activated by the network device for the terminal device;

information about an uplink carrier used by the terminal device to transmit information;

a quantity X of uplink carriers configured by the network device for the terminal device, where X is a positive integer greater than L, and L is a maximum quantity of uplink carriers on which the terminal device can perform uplink transmission simultaneously;

a quantity X of uplink carriers configured by the network device for the terminal device, where X is a positive integer greater than P, P is a maximum quantity of transmitters on which the terminal device can perform uplink transmission simultaneously; or a quantity m of uplink carriers used by the terminal device to transmit information, where m is a positive integer less than or equal to L.

The information about an uplink carrier may be at least one of the following: an identifier of the uplink carrier, an index of the uplink carrier, a frequency of the uplink carrier, a frequency index of the uplink carrier, a frequency identifier of the uplink carrier, or the like.

For a carrier, "an uplink carrier configured by the network device for the terminal device" indicates that this type of carrier may also be referred to as that the carrier is configured, or one carrier is configured. In this case, that is to say, the carrier is a configured carrier. Certainly, the carrier may alternatively be referred to as another name. This is not limited in this application. Specifically, the configured carrier may be that the terminal device has performed one or more of synchronization, measurement, and power control adjustment on the carrier, or the terminal device sends a reference signal on the carrier, or the network device only configures a carrier for the terminal device, but the terminal device does not need to perform physical downlink control channel (physical downlink control channel, PDCCH) sensing on the carrier, does not need to perform random access channel (random access channel, RACH) access, or does not need to perform uplink-synchronization channel (uplink-synchronization channel, UL-SCH) transmission, does not need to report a channel quality indicator (channel quality indicator, CQI), precoding matrix (precoding matrix indication, PMI), rank (rank indicator, RI), precoding type indicator (precoding type indicator, PTI), or channel state information reference signal (channel state information reference signal, CSI-RS) resource indicator (CSI-RS resource indicator, CRI), or does not need to send a sounding reference signal (sounding reference signal, SRS) on the carrier. In conclusion, this is not limited in the present invention.

"An uplink carrier activated by the network device for the terminal device" indicates that the carrier is activated, or one carrier is activated. That is to say, the carrier is an activated carrier. Certainly, the carrier may alternatively be referred to as another name. This is not limited in this application. Specifically, the activated carrier may be at least one of the following performed by the terminal device on the carrier: sending an SRS, sending a reference signal, performing PDCCH sensing, performing physical uplink control channel (physical uplink control channel, PUCCH) or short PUCCH (Short PUCCH, SPUCCH) transmission, or reporting a CQI/PMI/RI/PTI/CRI.

"An uplink carrier used by the terminal device to transmit information" indicates that the carrier is scheduled, or one carrier is scheduled. In this case, the carrier may also be referred to as a scheduled carrier. Certainly, the carrier may alternatively be referred to as another name. This is not limited in this application. The scheduled carrier may be that the terminal device sends information on the carrier, or may perform communication on the carrier, or may be that a network device allocates a resource to the terminal device for the terminal device to send information on the carrier by using the resource.

Specifically, for example, the network device configures 5 carriers for the terminal device, and activates 3 carriers thereof, so that the terminal device can use the carriers for communication at any time. However, during actual scheduling, the network device actually uses only 2 carriers of the 3 carriers for communication. It should be noted that the 3 carriers are a maximum quantity of parallel sending uplink carriers supported by UE, or in other words, the 3 carriers are a maximum quantity of TX transmitters that can be supported by the terminal device.

The foregoing content may be performed before step 203.

Figure 2:
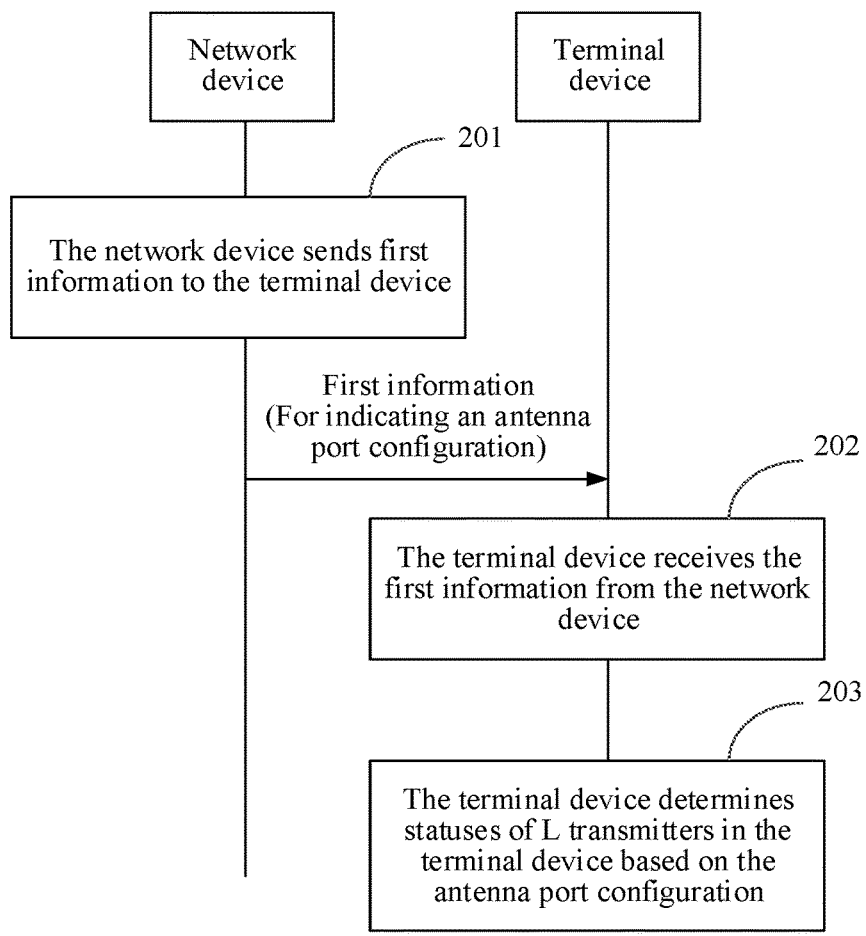
FIG. 2 is a schematic flowchart of a communication method according to an embodiment of this application.

With reference to the foregoing descriptions, FIG. 2 is a schematic flowchart of a communication method according to an embodiment of this application. Referring to FIG. 2, the method includes the following steps.

Step 201: A network device sends first information to a terminal device.

The first information is for indicating an antenna port configuration, and the antenna port configuration is an antenna port configuration used by an uplink carrier of the terminal device; or the antenna port configuration is an antenna port configuration used by each uplink carrier configured for the terminal device.

A specific manner in which the network device sends the first information is not limited in embodiments of this application. For example, the network device may send the first information by using higher layer signaling, or may send the first information by using downlink control information (downlink control information, DCI).

For example, in embodiments of this application, the network device may further indicate information about at least one uplink carrier to the terminal device. Optionally, the at least one uplink carrier is an activated uplink carrier, a configured uplink carrier, or a scheduled uplink carrier of the terminal device.

It should be noted that, it is assumed that a quantity of uplink carriers configured by the network device for the terminal device is X, not all of the X uplink carriers are necessarily activated, and the network device activates only Q of the X uplink carriers based on a capability of the terminal device, where Q is less than or equal to X.

After an uplink carrier is activated, the terminal device can send information on the uplink carrier only when the uplink carrier is scheduled. In other words, the at least one uplink carrier scheduled for use by the terminal device is some or all of the Q activated uplink carriers.

In embodiments of this application, in a possible implementation, the network device sends second information to the terminal device, where the second information is for indicating whether the uplink carrier is scheduled or whether the uplink carrier is activated.

The network device may send one piece of second information on a downlink carrier corresponding to each uplink carrier, and the second information is for indicating information about the uplink carrier. In this case, the second information may include one or more of the following: an identifier of the uplink carrier; an index of the uplink carrier; a frequency index of the uplink carrier; a frequency identifier of the uplink carrier; whether the uplink carrier is scheduled; or whether the uplink carrier is activated.

In another possible implementation, the network device may send one piece of second information on one downlink carrier, where the second information is for indicating information about the at least one uplink carrier. This implementation is applicable to a case in which the terminal device supports a quantity of uplink carriers greater than a quantity of downlink carriers. In this implementation, the second information may include one or more of the following: identifiers of m uplink carriers, indexes of m uplink carriers, frequency indexes of m uplink carriers, frequency identifiers of m uplink carriers, where m is a positive integer, and m is a quantity of the at least one scheduled uplink carrier, whether the uplink carrier is scheduled, and whether the uplink carrier is activated.

In this implementation, the second information includes A1 bits, and each bit is for indicating whether an uplink carrier is scheduled or activated for use. For example, the network device configures 5 uplink carriers, the second information may include 5 bits, and each bit corresponds to one uplink carrier. It is assumed that when a value of the bit is 1, it indicates that the uplink carrier is scheduled; when the value of the bit is 0, it indicates that the uplink carrier is not scheduled; and when the second information is 11000, it indicates that 2 of the 5 uplink carriers are scheduled. Specifically, numbers may be set for the 5 carriers. For example, the 2 uplink carriers are respectively a first carrier CC1 and a second carrier CC2 that are scheduled.

In this application, for step 201, in an implementation, the network device sends the first information to the terminal device, so that the terminal device obtains an antenna configuration of the uplink carrier, where the uplink carrier includes at least one uplink carrier, and the uplink carrier may be a configured carrier or an activated carrier. The network device further sends the second information to the terminal device, so that the terminal device obtains the information about a scheduled carrier based on the second information.

In this application, for step 201, in another implementation, the network device sends the first information to the terminal device, so that the terminal device obtains an antenna configuration of the uplink carrier, where the uplink carrier includes at least one uplink carrier, and the uplink carrier may be a scheduled carrier.

Step 202: The terminal device receives the first information from the network device, where the first information is for indicating an antenna port configuration, and the antenna port configuration includes an antenna port configuration used by an uplink carrier configured for the terminal device.

Specifically, if the network device configures X uplink carriers for the terminal device, the first information may be for indicating an antenna port configuration used by each of the X uplink carriers, for example, information such as a quantity of antenna ports and/or an antenna port number. A specific implementation of the first information is not limited in embodiments of this application. For details, refer to descriptions in the conventional technology.

In this application, for step 202, in an implementation, the network device sends the first information to the terminal device, so that the terminal device obtains the antenna port configuration of the uplink carrier, where the uplink carrier includes at least one uplink carrier, and the uplink carrier may be a configured carrier or an activated carrier. The network device further sends the second information to the terminal device, so that the terminal device obtains the information about a scheduled carrier based on the second information. The terminal device obtains, based on the first information and the second information, the antenna port configuration used by the uplink carrier configured for the terminal device.

In this application, for step 202, in another implementation, the network device sends the first information to the terminal device, so that the terminal device obtains an antenna configuration of the uplink carrier, where the uplink carrier includes at least one uplink carrier, for example, the uplink carrier may be a scheduled carrier.

Step 203: The terminal device determines statuses of L transmitters in the terminal device based on the antenna port configuration.

L is an integer greater than 0. A status of a transmitter includes at least one of an enabled state and a disabled state. A transmitter in the enabled state may be for sending information, but whether the transmitter is specifically for sending information further needs to be determined based on whether an uplink carrier corresponding to the transmitter is scheduled. A transmitter in the disabled state cannot be for sending information.

Further, there are a plurality of different combinations of the statuses of the L transmitters in the terminal device. In this embodiment of this application, for ease of description, a combination of the statuses of the L transmitters is referred to as a transmitter configuration. In other words, the transmitter configuration is for indicating transmitters in the enabled state and/or transmitters in the disabled state in the terminal device. In this application, content of the present invention is mainly described by using an example in which the transmitter configuration is for indicating the transmitters in the enabled state and the transmitters in the disabled state in the terminal device.

Further, the terminal device may send information on one uplink carrier by using one transmitter, or may send information on one uplink carrier by using a plurality of transmitters. Therefore, the transmitter configuration may further indicate a quantity of transmitters for sending information on a same uplink carrier. "Sending information on one uplink carrier by using one transmitter" may be equivalent to "sending information about one uplink carrier on one transmitter" or "transmitting information about one uplink carrier on one transmitter". "Sending information on one uplink carrier by using a plurality of transmitters" may be equivalent to "transmitting information about a same uplink carrier on a plurality of transmitters", that is, information transmitted on the plurality of transmitters is intended to serve a same uplink carrier, and is content of a same uplink carrier. However, information transmitted on a plurality of transmitters may be the same, or may be different.

For example, it is assumed that the terminal device includes 3 transmitters, which are respectively represented as a TX1, a TX2, and a TX3, and the terminal device may simultaneously use 2 of the transmitters to send information. In this case, a transmitter configuration of the terminal device may include cases shown in Table 1.

TABLE 1

| Transmitter configuration | |
|---|---|
| {1T, 1T, 0T} | Indicates that the TX1 and the TX2 are in an enabled state, the TX3 is in a disabled state, and the TX1 and the TX2 each send information by using one carrier |

TABLE 1-continued

Transmitter configuration

{1T, 0T, 1T}  Indicates that the TX1 and the TX3 are in an enabled state, the TX2 is in a disabled state, and the TX1 and the TX3 each send information by using one carrier
{0T, 1T, 1T}  Indicates that the TX2 and the TX3 are in an enabled state, the TX1 is in a disabled state, and the TX2 and the TX3 each send information by using one carrier
{2T, 0T, 0T}  Indicates that the TX1 and the TX2 are in an enabled state, the TX3 is in a disabled state, and the TX1 and the TX2 send information by using a same carrier
{0T, 2T, 0T}  Indicates that the TX2 and the TX3 are in an enabled state, the TX1 is in a disabled state, and the TX2 and the TX3 send information by using a same carrier
{0T, 0T, 2T}  Indicates that the TX1 and the TX3 are in an enabled state, the TX2 is in a disabled state, and the TX1 and the TX3 send information by using a same carrier In this embodiment of this application, the terminal device may further determine an antenna port transmission configuration based on at least one uplink carrier and the antenna port configuration, where the at least one uplink carrier is an uplink carrier for transmitting information, or the at least one uplink carrier is an uplink carrier scheduled for use by the terminal device, or the at least one uplink carrier is an activated uplink carrier. The activated uplink carrier is a carrier that can be for transmitting information at any time. Whether the activated uplink carrier is for transmitting information depends on whether the carrier is actually scheduled or whether a service on the carrier needs to transmit information. In the conventional technology, each carrier has a corresponding antenna port configuration. In this embodiment of this application, for ease of description, an antenna port corresponding to at least one carrier is referred to as an antenna port transmission configuration, or may be referred to as an antenna port transmission indication, or may be referred to as a carrier transmission indication, or may be referred to as a carrier transmission configuration. The antenna port transmission configuration is for indicating an antenna port corresponding to the at least one uplink carrier. In other words, the antenna port transmission configuration may indicate an antenna port that needs to be used when the terminal device sends information.

For example, L=3 is used as an example. In step 201 and step 202, the network device activates three uplink carriers for the terminal device, which are respectively a CC1, a CC2, and a CC3. When only the CC1 is scheduled, the antenna port transmission configuration may be represented as {1P, 0P, 0P}. 1P indicates that the terminal device needs to use an antenna port corresponding to the CC1 to send information, the first 0P indicates that the terminal device does not need to use an antenna port corresponding to the CC2 to send information, and the second 0P indicates that the terminal device does not need to use an antenna port corresponding to the CC3 to send information. Therefore, the terminal device determines, based on the antenna port configuration of the 3 carriers, that a corresponding antenna port transmission configuration is {1P, 0P, 0P}.

Further, in this embodiment of this application, there is a correspondence between a transmitter and an uplink carrier in the terminal device. The correspondence may be pre-configured. For example, it is assumed that the terminal device includes 3 transmitters, which are respectively represented as a TX1, a TX2, and a TX3, and the network device activates three uplink carriers, which are respectively a CC1, a CC2, and a CC3. For the terminal device, the TX1 may correspond to the CC1, the TX2 may correspond to the CC2, and the TX3 may correspond to the CC3.

With reference to the foregoing descriptions, from the perspective of a transmitter, if one transmitter in the terminal device is in an enabled state, an uplink carrier corresponding to the transmitter may be scheduled or may not be scheduled; or if one transmitter in the terminal device is in a disabled state, an uplink carrier corresponding to the transmitter is not scheduled. From the perspective of an uplink carrier, if an uplink carrier is scheduled, a transmitter corresponding to the uplink carrier is definitely in an enabled state; or if an uplink carrier is not scheduled, a transmitter corresponding to the uplink carrier may be in an enabled state, or may be in a disabled state.

With reference to the foregoing descriptions, in this embodiment of this application, a correspondence between a transmitter configuration and an antenna port transmission configuration may be pre-established, and a specific relationship establishment process is not described again. For example, when 3 carriers are activated for the terminal device, but only 2 carriers are actually used for transmission, or when 3 carriers are configured for the terminal device, but 2 carriers are actually used for information transmission, with reference to Table 1, when the terminal device includes 3 transmitters, a maximum of 2 transmitters can be used each time to send information, and when the network device activates three uplink carriers for the terminal device, the terminal device obtains one antenna port transmission configuration based on an antenna port configuration of each of the 3 carriers. The antenna port transmission configuration may correspond to 1 transmitter configuration. This means that the terminal device adjusts statuses of the 3 transmitters to the transmitter configuration. However, a plurality of antenna port transmission configurations may correspond to a same transmitter configuration. Therefore, this case is used as an example in this application, and a correspondence between a transmitter configuration and an antenna port transmission configuration may be listed in Table 2.

TABLE 2

| Transmitter configuration | Antenna port transmission configuration |
|---|---|
| {1T, 1T, 0T} | {1P, 1P, 0P}; {1P, 0P, 0P}; {0P, 1P, 0P} |
| {1T, 0T, 1T} | {1P, 0P, 1P}; {1P, 0P, 0P}; {0P, 0P, 1P} |
| {0T, 1T, 1T} | {0P, 1P, 1P}; {0P, 1P, 0P}; {0P, 0P, 1P} |
| {2T, 0T, 0T} | {2P, 0P, 0P}; {1PX, 0P, 0P} |
| {0T, 2T, 0T} | {0P, 2P, 0P}; {0P, 1PX, 0P} |
| {0T, 0T, 2T} | {0P, 0P, 2P}; {0P, 0P, 1PX} |

With reference to Table 2, it can be learned that in this embodiment of this application, one transmitter configuration corresponds to one or a plurality of antenna port transmission configurations. Correspondingly, one antenna port transmission configuration corresponds to one or a plurality of transmitter configurations.

With reference to the foregoing descriptions, when determining at least one scheduled uplink carrier, the terminal device may determine an antenna port transmission configuration, so that the terminal device may determine the statuses of the L transmitters in the terminal device based on the antenna port transmission configuration. The following separately provides descriptions. Specifically, for example, the at least one scheduled uplink carrier may be at least one uplink carrier for actually transmitting information.

For ease of description, in the following descriptions, the statuses of the L transmitters determined based on the antenna port transmission configuration are referred to as a first transmitter configuration, and statuses of the L transmitters when or before the terminal device receives the first information is referred to as a second transmitter configuration. It should be noted that the second transmitter configuration is current statuses of the L transmitters in the terminal device, and the first transmitter configuration is statuses of the L transmitters that need to be configured before the terminal device sends information.

For a manner in which the terminal device determines the statuses of the L transmitters based on the antenna port transmission configuration in step 203, more descriptions are provided in the following embodiments of this application.

It should be noted that an antenna port used by the terminal device to transmit information on a scheduled uplink carrier is an antenna port configured for the uplink carrier.

In this embodiment of this application, a plurality of transmitters may be supported in sending information on one uplink carrier by using different antenna ports, or a plurality of transmitters may be supported in sending information on one uplink carrier by using a same antenna port.

For example, with reference to Table 2, when the first transmitter configuration is {2T, 0T, 0T}, and the antenna port transmission configuration is {2P, 0P, 0P}, it indicates that information is transmitted on the CC1 by using the TX1 and the TX1, and the TX1 and the TX1 separately transmit information by using different antenna ports; and when the first transmitter configuration is {2T, 0T, 0T}, and the antenna port transmission configuration is {1PX, 0P, 0P}, it indicates that information is transmitted on the CC1 by using the TX1 and the TX1, and the TX1 and the TX1 transmit information by using a same antenna port.

Further, when determining that a quantity of antenna ports is less than a quantity of transmitters, that is, when determining to send information on one uplink carrier by using a same antenna port through a plurality of transmitters, the terminal device may send the information on the antenna port by using a high power gain.

Further, there may be a plurality of methods for how the network device indicates the terminal device to set the first transmitter configuration to {2T, 0T, 0T}, or how the terminal device sets the first transmitter configuration to {2T, 0T, 0T} by using an antenna port transmission configuration {1P, 0P, 0P}.

Specifically, the terminal device supports a plurality of transmitters in sending information on one uplink carrier by using a same antenna port, and in this case, the terminal device may send information by using a transmit power higher than a normal power. In the foregoing case, when configuring the carrier, the network device may indicate the terminal device to send information by using a power higher than the normal power, so as to indicate the terminal device to set the first transmitter configuration to {2T, 0T, 0T}.

Specifically, for example, when reporting the capability information, the terminal device notifies the network device that the terminal device supports sending information through a single port by using 2 TXs, and a transmit power may be supported to be 3 dBm higher than an original normal transmit power 23 dBm. Therefore, the network device may indicate, by using 1 bit (bit), the terminal device to send information on a carrier by using a power higher than a normal transmit power. For example, 1 indicates 26 dBm, and 0 indicates 23 dBm. Therefore, the terminal device is actually indicated to send information on a carrier by using 2 TXs.

In all embodiments of this application, the network device indicates the first transmit power to indicate the terminal device to use M TXs to send information on a carrier by using a single antenna port. For specific implementation details, refer to Embodiment 5.

Optionally, the method may further include the following step: The terminal device may determine a transmitter that is in the L transmitters and that is in an enabled state and that corresponds to an uplink carrier in the at least one uplink carrier as at least one transmitter for transmitting information.

Optionally, the method may further include the following step: After determining the statuses of the L transmitters, the terminal device determines to perform transmitter switching or to skip performing transmitter switching; or the terminal device determines the first transmitter configuration, and determines to perform transmitter switching or to skip performing transmitter switching.

Specifically, the at least one transmitter that is in the terminal device and that is for transmitting information is determined based on the statuses of the L transmitters, that is, the terminal device determines the first transmitter configuration. The terminal device then determines whether transmitter switching needs to be performed. Specifically, if the first transmitter configuration is different from the second transmitter configuration, the terminal device determines to perform transmitter configuration switching. In other words, if a transmitter of the terminal device needs to be switched, a switching time needs to be determined, and then data is sent. If the first transmitter configuration is the same as the second transmitter configuration, the terminal device determines to skip performing transmitter configuration switching, or may determine to keep a current transmitter configuration unchanged. In other words, each transmitter of the terminal device does not need to be switched.

Embodiment 1

For step 203, a possible implementation may be described as follows by using an example. Other steps are consistent with content in the foregoing embodiment, and details are not described again.

Step 203: The terminal device determines statuses of L transmitters in the terminal device based on the antenna port configuration. Specifically, step A, step B, and step C may be included. In the 3 steps, the terminal device only needs to choose to perform 1 of the 3 steps according to an actual situation.

Step A: After the terminal device determines the antenna port transmission configuration, if the terminal device determines that the antenna port transmission configuration can correspond to only one transmitter configuration, the terminal device may determine the transmitter configuration corresponding to the antenna port transmission configuration as the first transmitter configuration.

For example, with reference to Table 2, if the determined antenna port transmission configuration is {1P, 1P, 0P}, it can be learned from Table 2 that {1P, 1P, 0P} can only correspond to {1T, 1T, 0T}. In this case, {1T, 1T, 0T} may be directly used as the first transmitter configuration. In this case, actually, there is a one-to-one correspondence between the first transmitter configuration and the antenna port transmission configuration.

Step B: After the terminal device determines the antenna port transmission configuration, if the terminal device determines that a plurality of transmitter configurations corresponding to the antenna port transmission configuration include the second transmitter configuration, the terminal device determines that the second transmitter configuration is the same as the first transmitter configuration, that is, may determine the second transmitter configuration as the first transmitter configuration.

For example, with reference to Table 2, if the second transmitter configuration is {1T, 0T, 1T}, and the determined antenna port transmission configuration is {1P, 0P, 0P}, it can be learned from Table 2 that {1P, 0P, 0P} corresponds to {1T, 1T, 0T} and {1T, 0T, 1T}, where the second transmitter configuration is included. In this case, the second transmitter configuration may be used as the first transmitter configuration, so that the current transmitter configuration remains unchanged.

Step C: After the terminal device determines the antenna port transmission configuration, if the terminal device determines that a plurality of transmitter configurations corresponding to the antenna port transmission configuration do not include the second transmitter configuration, the terminal device may select one transmitter configuration from one or a plurality of transmitter configurations corresponding to the antenna port transmission configuration as the first transmitter configuration. Details about the selection are described below.

If the second transmitter configuration is {1T, 0T, 1T}, and the determined antenna port transmission configuration is {0P, 0P, 1P}, it can be learned from Table 2 that {0P, 0P, 1P} corresponds to {0T, 1T, 1T} and {1T, 0T, 1T}, where the second transmitter configuration is not included. Therefore, one of {0T, 1T, 1T} and {1T, 0T, 1T} may be selected as the first transmitter configuration.

For step C, an example of a specific manner in which a transmitter configuration is selected as the first transmitter configuration is described as follows: For the statuses of the L transmitters, there may be N transmitter configurations.

For example, 3 activated carriers are configured for the terminal device, and actually 2 carriers are used for sending information in parallel. There may be 6 transmitter configurations of the terminal device (in this case, N=6). For details, refer to Table 3-1.

TABLE 3-1

| Index value | Transmitter configuration | Antenna port transmission configuration |
|---|---|---|
| 001 | {1T, 1T, 0T} | {1P, 1P, 0P}; {1P, 0P, 0P}; {0P, 1P, 0P} |
| 010 | {1T, 0T, 1T} | {1P, 0P, 1P}; {1P, 0P, 0P}; {0P, 0P, 1P} |
| 011 | {0T, 1T, 1T} | {0P, 1P, 1P}; {0P, 1P, 0P}; {0P, 0P, 1P} |
| 100 | {2T, 0T, 0T} | {2P, 0P, 0P}; {1PX, 0P, 0P} |
| 101 | {0T, 2T, 0T} | {0P, 2P, 0P}; {0P, 1PX, 0P} |
| 110 | {0T, 0T, 2T} | {0P, 0P, 2P}; {0P, 0P, 1PX} |

For example, with reference to Table 3-1, each group of transmitter configurations includes one transmitter configuration, and a corresponding index value may be shown in Table 3-1.

For example, the second transmitter configuration is located in a transmitter configuration (for example, an index value is 001, {1T, 1T, 0T}) in the 6 transmitter configurations, and the transmitter configuration is referred to as a first group of transmitter configurations. After the terminal device determines the antenna port transmission configuration (for example, the antenna port transmission configuration is {0P, 0P, 1P}), the antenna port transmission configuration may correspond to a plurality of transmitter configurations, but cannot correspond to an antenna port transmission configuration included in the second transmitter configuration.

In this case, the first transmitter configuration may be determined in the following manner: If determining that a transmitter configuration that meets a condition does not exist in the first transmitter configuration, the terminal device determines, from the N transmitter configurations in a preset sequence, the transmitter configuration that meets the condition, and uses the transmitter configuration that meets the condition as the first transmitter configuration. The transmitter configuration that meets the condition means that one or a plurality of antenna port configurations corresponding to the transmitter configuration include the antenna port transmission configuration.

It should be noted that, it is assumed that each of the N transmitter configurations corresponds to one index value, the preset sequence may be a cycle sequence in descending order of the index values of the N transmitter configurations, or may be a cycle sequence in ascending order of the index values of the N transmitter configurations. This is not limited in embodiments of this application. There may be another implementation of the preset sequence, which is not listed one by one herein.

With reference to Table 3-1, if the second transmitter configuration is {0T, 0T, 2T}, and the determined antenna port transmission configuration is {0P, 0P, 1P}, it can be learned from Table 2 that, {0P, 0P, 1P} does not correspond to {0T, 0T, 2T}. Therefore, whether a transmitter configuration that meets the condition exists in transmitter configurations corresponding to index values 001, 010, 011, . . . , and 101 may be sequentially determined according to a cycle sequence in descending order of the index values. In this example, the transmitter configuration that meets the condition may be first determined from the transmitter configuration corresponding to 010, so that {1T, 0T, 1T} may be used as the first transmitter configuration.

In the foregoing example, one transmitter configuration is grouped into one group. In an actual application, there may be another grouping case. For example, {1T, 1T, 0T} and {1T, 1T, 0T} are grouped into one group, {0T, 1T, 1T} and {2T, 0T, 0T} are grouped into one group, and {0T, 2T, 0T} and {0T, 0T, 2T} are grouped into one group. Details are not described herein again.

With reference to Table 3-1, it is assumed that the terminal device includes 3 transmitters, which are respectively represented as a TX1, a TX2, and a TX3, and the terminal device may simultaneously use 2 of the transmitters to send information. The network device activates three uplink carriers for the terminal device, which are respectively a CC1, a CC2, and a CC3, where the TX1 corresponds to the CC1, the TX2 corresponds to the CC2, and the TX3 corresponds to the CC3. In this case, for meanings of different antenna port transmission configurations, refer to Table 3-2.

TABLE 3-2

| Antenna port transmission configuration | |
|---|---|
| {1P, 1P, 0P} | Indicates antenna ports corresponding to the CC1 and the CC2; representing that the terminal device is scheduled to send information on the CC1 and the CC2; |
| {1P, 0P, 1P} | Indicates antenna ports corresponding to the CC1 and the CC3; representing that the terminal device is scheduled to send information on the CC1 and the CC3; |

TABLE 3-2-continued

| Antenna port transmission configuration | |
|---|---|
| {0P, 1P, 1P} | Indicates antenna ports corresponding to the CC2 and the CC3; representing that the terminal device is scheduled to send information on the CC2 and the CC3; |
| {2P, 0P, 0P} | Indicates an antenna port corresponding to the CC1; representing that the terminal device is scheduled to send information on the CC1 by using two transmitters, and the two transmitters are respectively mapped to different antenna ports; |
| {0P, 2P, 0P} | Indicates an antenna port corresponding to the CC2; representing that the terminal device is scheduled to send information on the CC2 by using two transmitters, and the two transmitters are respectively mapped to different antenna ports; |
| {0P, 0P, 2P} | Indicates an antenna port corresponding to the CC3; representing that the terminal device is scheduled to send information on the CC3 by using two transmitters, and the two transmitters are respectively mapped to different antenna ports; |
| {1P, 0P, 0P} | Indicates an antenna port corresponding to the CC1; representing that the terminal device is scheduled to send information on the CC1; |
| {0P, 1P, 0P} | Indicates an antenna port corresponding to the CC2; representing that the terminal device is scheduled to send information on the CC2; |
| {0P, 0P, 1P} | Indicates an antenna port corresponding to the CC3; representing that the terminal device is scheduled to send information on the CC3; |
| {1PX, 0P, 0P} | Indicates an antenna port corresponding to the CC1; representing that the terminal device is scheduled to send information on the CC1 by using two transmitters, the two transmitters are mapped to one antenna port, and the terminal device sends information on the antenna port by using a high power gain (or a second transmit power); |
| {0P, 1PX, 0P} | Indicates an antenna port corresponding to the CC2; representing that the terminal device is scheduled to send information on the CC2 by using two transmitters, the two transmitters are mapped to one antenna port, and the terminal device sends information on the antenna port by using a high power gain (or a second transmit power); |
| {0P, 0P, 1PX} | Indicates an antenna port corresponding to the CC3; representing that the terminal device is scheduled to send information on the CC3 by using two transmitters, the two transmitters are mapped to one antenna port, and the terminal device sends information on the antenna port by using a high power gain (or a second transmit power); |

It should be noted that 1PX and 1P in the table actually have a same meaning, and are merely for describing, in this case, the terminal device sends information on one antenna port on one carrier by using two transmitters.

Specifically, for a case in which {1PX, 0P, 0P} corresponds to {2T, 0T, 0T}, a manner in which the network device indicates the terminal device to set the first transmitter configuration to {2T, 0T, 0T}, or in other words, a manner in which the terminal device sets the first transmitter configuration to {2T, 0T, 0T} by using an antenna port transmission configuration {1P, 0P, 0P} is described in detail below.

Specifically, the terminal device supports a plurality of transmitters (for example, may support 2 TXs, 3 TXs, or 4 TXs) in sending information on one uplink carrier by using a same antenna port, and in this case, the terminal device may send information by using a transmit power higher than a normal power. In the foregoing case, when configuring the carrier, the network device may indicate the terminal device to send information by using a power higher than the normal power, so as to indicate the terminal device to set the first transmitter configuration to {2T, 0T, 0T}.

Specifically, for example, when reporting the capability information, the terminal device notifies the network device that the terminal device supports sending information through a single port by using 2 TXs, and a transmit power may be supported to be 3 dBm higher than an original normal transmit power 23 dBm. Therefore, the network device may indicate, by using 1 bit, the terminal device to send information on a carrier by using a power higher than a normal transmit power. For example, 1 indicates 26 dBm, and 0 indicates 23 dBm. Therefore, the terminal device is actually indicated to send information on a carrier by using 2 TXs.

Therefore, in all embodiments of this application, the network device indicates the first transmit power to indicate the terminal device to use M TXs to send information on a carrier by using a single antenna port. For specific implementation details, refer to Embodiment 5.

Embodiment 2

For step 203, a possible implementation may be described as follows by using an example. Other steps are consistent with content in the foregoing embodiment, and details are not described again.

Step 203: The terminal device determines statuses of L transmitters in the terminal device based on the antenna port configuration.

Different from Embodiment 1, in this embodiment of this application, N groups of transmitter configurations may be predetermined, and the N groups of transmitter configurations are determined based on enabled states and disabled states of the L transmitters in the terminal device. It is assumed that the terminal device includes 3 transmitters, which are respectively represented as a TX1, a TX2, and a TX3, and the terminal device may simultaneously use 2 of the transmitters to send information. In this case, there may be 6 transmitter configurations shown in Table 1 for enabled states and disabled states of the 3 transmitters in the terminal device, and the N groups of transmitter configurations may be determined based on the 6 transmitter configurations. For example, {1T, 1T, 0T} and {1T, 1T, 0T} are grouped into one group, {0T, 1T, 1T} and {2T, 0T, 0T} are grouped into one group, and {0T, 2T, 0T} and {0T, 0T, 2T} are grouped into one group. In an actual application, there may be another grouping case, and no example is provided herein.

It should be noted that each of the N groups of transmitter configurations includes at least one transmitter configuration, where N is an integer greater than 1.

Specifically, step A, step B, and step C may be included. In the 3 steps, the terminal device only needs to choose to perform 1 of the 3 steps according to an actual situation.

Step A: One antenna port transmission configuration corresponds to one or a plurality of transmitter configurations. If the antenna port transmission configuration corresponds to only one transmitter configuration, the transmitter configuration corresponding to the antenna port transmission configuration may not need to be compared with the second transmitter configuration, and the transmitter configuration corresponding to the antenna port transmission configuration is directly used as the first transmitter configuration.

It should be noted that, because a correspondence between a transmitter configuration and an antenna port transmission configuration is pre-established, the terminal device may determine a quantity of transmitter configurations corresponding to each antenna port transmission configuration.

Specifically, if the terminal device determines one transmitter configuration corresponding to the antenna port transmission configuration, the terminal device may determine the transmitter configuration corresponding to the antenna port transmission configuration as the first transmitter configuration.

Step B: If it is determined that the antenna port transmission configuration corresponds to a plurality of transmitter configurations and includes the second transmitter configuration, the terminal device may determine the second transmitter configuration as the first transmitter configuration.

Step C: If it is determined that the antenna port transmission configuration corresponds to a plurality of transmitter configurations and does not include the second transmitter configuration, the terminal device may select one transmitter configuration from one or a plurality of transmitter configurations corresponding to the antenna port transmission configuration as the first transmitter configuration.

For step C, all transmitter configurations corresponding to the L transmitters of the terminal device are divided into N groups of transmitter configurations, where each group of transmitter configurations includes at least one transmitter configuration, and N is an integer greater than 1. In this case, a specific selection manner is described in detail below.

It is assumed that the second transmitter configuration is located in the first group of transmitter configurations of the N groups of transmitter configurations. When the antenna port transmission configuration corresponds to a plurality of transmitter configurations and does not include the second transmitter configuration, the first transmitter configuration may be determined in the following manner:

if determining that a transmitter configuration that meets a condition exists in the first group of transmitter configurations, using, by the terminal device, the transmitter configuration that meets the condition as the first transmitter configuration, where the transmitter configuration that meets the condition means that one or a plurality of antenna port configurations corresponding to the transmitter configuration include the antenna port transmission configuration; or if determining that a transmitter configuration that meets a condition does not exist in the first group of transmitter configurations, determining, by the terminal device from the N groups of transmitter configurations in a preset sequence, the transmitter configuration that meets the condition, and using the transmitter configuration that meets the condition as the first transmitter configuration, where the transmitter configuration that meets the condition means that one or a plurality of antenna port configurations corresponding to the transmitter configuration include the antenna port transmission configuration.

It should be noted that, it is assumed that each of the N groups of transmitter configurations corresponds to one index value, the preset sequence may be a cycle sequence in descending order of the index values of the N groups of transmitter configurations, or may be a cycle sequence in ascending order of the index values of the N groups of transmitter configuration s. This is not limited in embodiments of this application. There may be another implementation of the preset sequence, which is not listed one by one herein.

For example, with reference to Table 2, each group of transmitter configurations includes one transmitter configuration, and a corresponding index value may be shown in Table 4.

TABLE 4

| Transmitter configuration | Index value |
| --- | --- |
| {1T, 1T, 0T} | 001 |
| {1T, 1T, 0T} | 010 |
| {0T, 1T, 1T} | 011 |
| {2T, 0T, 0T} | 100 |
| {0T, 2T, 0T} | 101 |
| {0T, 0T, 2T} | 110 |

With reference to Table 2, if the second transmitter configuration is {0T, 0T, 2T}, and the determined antenna port transmission configuration is {0P, 0P, 1P}, it can be learned from Table 2 that, {0P, 0P, 1P} does not correspond to {0T, 0T, 2T}. Therefore, whether a transmitter configuration that meets the condition exists in transmitter configurations corresponding to index values 001, 010, 011, . . . , and 101 may be sequentially determined according to a cycle sequence in descending order of the index values. In this example, the transmitter configuration that meets the condition may be first determined from the transmitter configuration corresponding to 010, so that {1T, 0T, 1T} may be used as the first transmitter configuration.

In the foregoing example, one transmitter configuration is grouped into one group. In an actual application, there may be another grouping case. For example, {1T, 1T, 0T} and {1T, 1T, 0T} are grouped into one group, {0T, 1T, 1T} and {2T, 0T, 0T} are grouped into one group, and {0T, 2T, 0T} and {0T, 0T, 2T} are grouped into one group. Details are not described herein again.

Optionally, in another possible implementation, the first transmitter configuration may be alternatively determined in the following manner:

if the antenna port transmission configuration corresponds to only one transmitter configuration, determining the transmitter configuration corresponding to the antenna port transmission configuration as the first transmitter configuration;

if the antenna port transmission configuration corresponds to a plurality of transmitter configurations, and the plurality of transmitter configurations include the second transmitter configuration, determining, by the terminal device, the second transmitter configuration as the first transmitter configuration; or if the antenna port transmission configuration corresponds to a plurality of transmitter configurations, and the plurality of transmitter configurations do not include the second transmitter configuration, determining, from at least one transmitter configuration in a preset sequence, a transmitter configuration that meets a condition, and using the transmitter configuration that meets the condition as the first transmitter configuration, where the at least one transmitter configuration is determined based on the L transmitters of the terminal device; and the transmitter configuration that meets the condition means that one or a plurality of antenna port configurations corresponding to the transmitter configuration include the antenna port transmission configuration.

Specifically, the at least one transmitter configuration is determined based on enabled states and disabled states of the L transmitters in the terminal device. It is assumed that the terminal device includes 3 transmitters, which are respectively represented as a TX1, a TX2, and a TX3, and the terminal device may simultaneously use 2 of the transmitters to send information. In this case, there may be 6 transmitter configurations shown in Table 1 for enabled states and disabled states of the 3 transmitters in the terminal device.

For a specific implementation, or content described in Embodiment 1 or Embodiment 2, before step 201, to ensure that the network device and the terminal device have a consistent understanding of the statuses of the L transmitters in the terminal device, optionally, before the terminal device determines the first transmitter configuration, the network device and the terminal device may further synchronize the statuses of the L transmitters in the terminal device. A synchronization method may include but is not limited to any one of the following manners:

Manner 1: The statuses of the L transmitters in the terminal device may be set to pre-configured states. Specifically, the statuses of the L transmitters in the terminal device may be pre-agreed on. For example, when the terminal device has 3 transmitters, the network device may select one antenna port transmission configuration to configure antenna port configurations of the 3 carriers of the terminal device. For example, the selected antenna port transmission configuration can correspond to only one transmitter configuration. In this way, when the network device does not explicitly indicate a TX state, that is, a transmitter transmission configuration, the transmitter transmission configuration may be aligned with the terminal device. In this case, it may be understood that initial transmitter configurations are synchronized.

Manner 2: The terminal device indicates the statuses of the L transmitters in the terminal device to the network device. For example, the network device may send third information to the terminal device, where the third information is for indicating the statuses of the L transmitters in the terminal device. A specific indication manner is not limited in embodiments of this application. Optionally, the terminal device indicates the statuses of the L transmitters in the terminal device at a moment T1 to the network device.

Manner 3: The network device indicates the statuses of the L transmitters in the terminal device to the terminal device. For example, the terminal device sends fifth information to the network device, where the fifth information is for indicating the statuses of the L transmitters in the terminal device. A specific indication manner is not limited in embodiments of this application. Optionally, the network device indicates the statuses of the L transmitters in the terminal device at a moment T2.

It should be noted that the statuses of the L transmitters in the terminal device only need to be synchronized once between the network device and the terminal device. Certainly, a quantity of synchronization times is not limited in this application.

Further, as described above, when the transmitter of the terminal device is in an enabled state, information does not necessarily need to be transmitted. In this embodiment of this application, after determining the first transmitter configuration, the terminal device may further determine, based on a status of a transmitter corresponding to each of the at least one uplink carrier, at least one transmitter for transmitting information. The at least one uplink carrier is for transmitting information, or the at least one uplink carrier is an uplink carrier scheduled for use by the terminal device.

It should be noted that "the transmitter of the terminal device is in an enabled state" may be understood as follows:

The transmitter may transmit information; or the transmitter transmits information; or the terminal device has performed adjustment such as synchronization and/or power control on a carrier by using the transmitter.

Optionally, the method may further include the following step: The terminal device may determine a transmitter that is in the L transmitters and that is in an enabled state and that corresponds to an uplink carrier in the at least one uplink carrier as at least one transmitter for transmitting information.

Specifically, the terminal device may determine a transmitter that is in the L transmitters and that is in an enabled state and that corresponds to an uplink carrier in the at least one uplink carrier as the at least one transmitter for transmitting information.

For example, it is assumed that the terminal device includes 3 transmitters, which are respectively represented as a TX1, a TX2, and a TX3, the network device activates three uplink carriers for the terminal device, which are respectively a CC1, a CC2, and a CC3, where the TX1 corresponds to the CC1, the TX2 corresponds to the CC2, and the TX3 corresponds to the CC3. When the first transmitter configuration determined by the terminal device is {1T, 1T, 0T}, and the CC1 is scheduled, it may be determined that the TX1 is the at least one transmitter for transmitting information. Although the TX2 is in an enabled state, the corresponding CC2 is not scheduled, and therefore is not for transmitting information.

Optionally, the method further includes the following step: After determining the statuses of the L transmitters, the terminal device determines to perform transmitter switching or to skip performing transmitter switching; or the terminal device determines the first transmitter configuration, and determines to perform transmitter switching or to skip performing transmitter switching.

Specifically, the at least one transmitter that is in the terminal device and that is for transmitting information is determined based on the statuses of the L transmitters, that is, the terminal device determines the first transmitter configuration. The terminal device then determines whether transmitter switching needs to be performed. Specifically, if the first transmitter configuration is different from the second transmitter configuration, the terminal device determines to perform transmitter configuration switching. In other words, if a transmitter of the terminal device needs to be switched, a switching time needs to be determined, and then data is sent. If the first transmitter configuration is the same as the second transmitter configuration, the terminal device determines to skip performing transmitter configuration switching, or may determine to keep a current transmitter configuration unchanged. In other words, each transmitter of the terminal device does not need to be switched.

This application further relates to content about power and transmitter configuration, which are described in detail below:

It should be noted that an antenna port used by the terminal device to transmit information on a scheduled uplink carrier is an antenna port configured for the uplink carrier.

In this embodiment of this application, a plurality of transmitters may be supported in sending information on one uplink carrier by using different antenna ports, or a plurality of transmitters may be supported in sending information on one uplink carrier by using a same antenna port.

For example, with reference to Table 2, when the first transmitter configuration is {2T, 0T, 0T}, and the antenna port transmission configuration is {2P, 0P, 0P}, it indicates that information is transmitted on the CC1 by using the TX1 and the TX1, and the TX1 and the TX1 separately transmit information by using different antenna ports; and when the first transmitter configuration is {2T, 0T, 0T}, and the antenna port transmission configuration is {1PX, 0P, 0P}, it indicates that information is transmitted on the CC1 by using the TX1 and the TX1, and the TX1 and the TX1 transmit information by using a same antenna port.

Further, when determining that a quantity of antenna ports is less than a quantity of transmitters, that is, when determining to send information on one uplink carrier by using a same antenna port through a plurality of transmitters, the terminal device may send the information on the antenna port by using a high power gain.

Further, a manner in which the network device indicates the terminal device to set the first transmitter configuration to {2T, 0T, 0T}, or a manner in which the terminal device sets the first transmitter configuration to {2T, 0T, 0T} by using an antenna port transmission configuration {1P, 0P, 0P} is described in detail below.

Specifically, the terminal device supports a plurality of transmitters (for example, may support 2 TXs, 3 TXs, or 4 TXs) in sending information on one uplink carrier by using a same antenna port, and in this case, the terminal device may send information by using a transmit power higher than a normal power. In the foregoing case, when configuring the carrier, the network device may indicate the terminal device to send information by using a power higher than the normal power, so as to indicate the terminal device to set the first transmitter configuration to {2T, 0T, 0T}.

Specifically, for example, when reporting the capability information, the terminal device notifies the network device that the terminal device supports sending information through a single port by using 2 TXs, and a transmit power may be supported to be 3 dBm higher than an original normal transmit power 23 dBm. Therefore, the network device may indicate, by using 1 bit, the terminal device to send information on a carrier by using a power higher than a normal transmit power. For example, 1 indicates 26 dBm, and 0 indicates 23 dBm. Therefore, the terminal device is actually indicated to send information on a carrier by using 2 TXs.

In all embodiments of this application, the network device indicates the first transmit power to indicate the terminal device to use M TXs to send information on a carrier by using a single antenna port. For specific implementation details, refer to Embodiment 5.

Embodiment 3

In the foregoing embodiments, the terminal device needs to determine the statuses of the L transmitters based on an antenna port configuration of each of the at least one carrier. In this embodiment of this application, the network device may directly indicate the statuses of the L transmitters, and details are described below.

Manner 1: Table 2 provides antenna port transmission configurations corresponding to different transmitter configurations. Therefore, in this application, all possible configuration combinations including the antenna port transmission configurations and the transmitter configurations may be first determined, and then a corresponding configuration combination is directly indicated to the terminal device.

It is assumed that a quantity of all possible configuration combinations including the antenna port transmission configurations and the transmitter configurations is H, and H is an integer greater than 0. Each of the H configuration combinations includes one antenna port transmission configuration and one transmitter configuration, and each of the H configuration combinations corresponds to one index value.

When the network device determines to indicate the first configuration combination in the H configuration combinations to the terminal device, the network device may send scheduling information to the terminal device, where the scheduling information is for indicating an index value of the first configuration combination. The terminal device may determine the first configuration combination based on the index value indicated by the scheduling information, so as to determine the antenna port transmission configuration and the transmitter configuration that are included in the first configuration combination, and further determine the statuses of the L transmitters and the at least one scheduled uplink carrier.

For example, with reference to Table 2, Table 5 shows all the possible configuration combinations including the antenna port transmission configurations and the transmitter configurations. The network device indicates, by sending the index value, the statuses of the transmitters corresponding to the antenna port configuration of the terminal device. Therefore, it is ensured that the network device aligns the statuses of the transmitters of the terminal device with those of the terminal device.

TABLE 5

| Index value | Transmitter configuration | Antenna port transmission configuration |
|---|---|---|
| 0000 | {1T, 1T, 0T} | {1P, 1P, 0P} |
| 0001 | {1T, 0T, 1T} | {1P, 0P, 1P} |
| 0010 | {0T, 1T, 1T} | {0P, 1P, 1P} |
| 0011 | {2T, 0T, 0T} | {2P, 0P, 0P} |
| 0100 | {0T, 2T, 0T} | {0P, 2P, 0P} |
| 0101 | {0T, 0T, 2T} | {0P, 0P, 2P} |
| 0110 | {1T, 1T, 0T} | {1P, 0P, 0P} |
| 0111 | {1T, 0T, 1T} | {1P, 0P, 0P} |
| 1000 | {2T, 0T, 0T} | {1PX, 0P, 0P} |
| 1001 | {1T, 1T, 0T} | {0P, 1P, 0P} |
| 1010 | {0T, 1T, 1T} | {0P, 1P, 0P} |
| 1011 | {0T, 2T, 0T} | {0P, 1PX, 0P} |
| 1100 | {1T, 0T, 1T} | {0P, 0P, 1P} |
| 1101 | {0T, 1T, 1T} | {0P, 0P, 1P} |
| 1110 | {0T, 0T, 2T} | {0P, 0P, 1PX} |

With reference to Table 5, when the scheduling information sent by the network device is 0010, the terminal device may determine that the first transmitter configuration is {0T, 1T, 1T} and the antenna port transmission configuration is {0P, 1P, 1P}. Other cases are not described again.

Manner 2: It can be learned from the foregoing descriptions that there is a one-to-one correspondence between some transmitter configurations and antenna port transmission configurations. In this case, the first transmitter configuration may not be indicated, but the first transmitter configuration is indirectly indicated by using the scheduled uplink carrier. Specifically, in this case, a transmitter corresponding to the scheduled uplink carrier is in an enabled state, and a transmitter corresponding to an unscheduled uplink carrier is in a disabled state.

For example, it is assumed that the terminal device includes 3 transmitters, which are respectively represented as a TX1, a TX2, and a TX3, the network device activates three uplink carriers for the terminal device, which are respectively a CC1, a CC2, and a CC3, where the TX1 corresponds to the CC1, the TX2 corresponds to the CC2, and the TX3 corresponds to the CC3. When scheduling the terminal device to transmit information on the CC1 and the CC2, the network device may not indicate the first transmitter configuration. In this case, the terminal device may determine, based on the scheduled uplink carrier, that the first transmitter configuration is {1T, 1T, 0T}. When scheduling the terminal device to transmit information on the CC1 and the CC3, the network device may not indicate the first transmitter configuration. In this case, the terminal device may determine, based on the scheduled uplink carrier, that the first transmitter configuration is {1T, 0T, 1T}.

When the antenna port transmission configuration corresponds to a plurality of transmitter configurations, the method in Manner 1 may be used to directly perform indication. For example, indication may be shown in Table 6.

TABLE 6

| Index value | Transmitter configuration | Antenna port transmission configuration |
|---|---|---|
| 0000 | {1T, 1T, 0T} | {1P, 0P, 0P} |
| 0001 | {1T, 0T, 1T} | {1P, 0P, 0P} |
| 0010 | {2T, 0T, 0T} | {1PX, 0P, 0P} |
| 0011 | {1T, 1T, 0T} | {0P, 1P, 0P} |
| 0100 | {0T, 1T, 1T} | {0P, 1P, 0P} |
| 0101 | {0T, 2T, 0T} | {0P, 1PX, 0P} |
| 0110 | {1T, 0T, 1T} | {0P, 0P, 1P} |
| 0111 | {0T, 1T, 1T} | {0P, 0P, 1P} |
| 1000 | {0T, 0T, 2T} | {0P, 0P, 1PX} |

Certainly, there may be another implementation of the foregoing indication example. Details are not described herein again.

Embodiment 4

In this embodiment of this application, the network device may alternatively directly indicate the statuses of the L transmitters in the terminal device. Details are described below.

Figure 3:
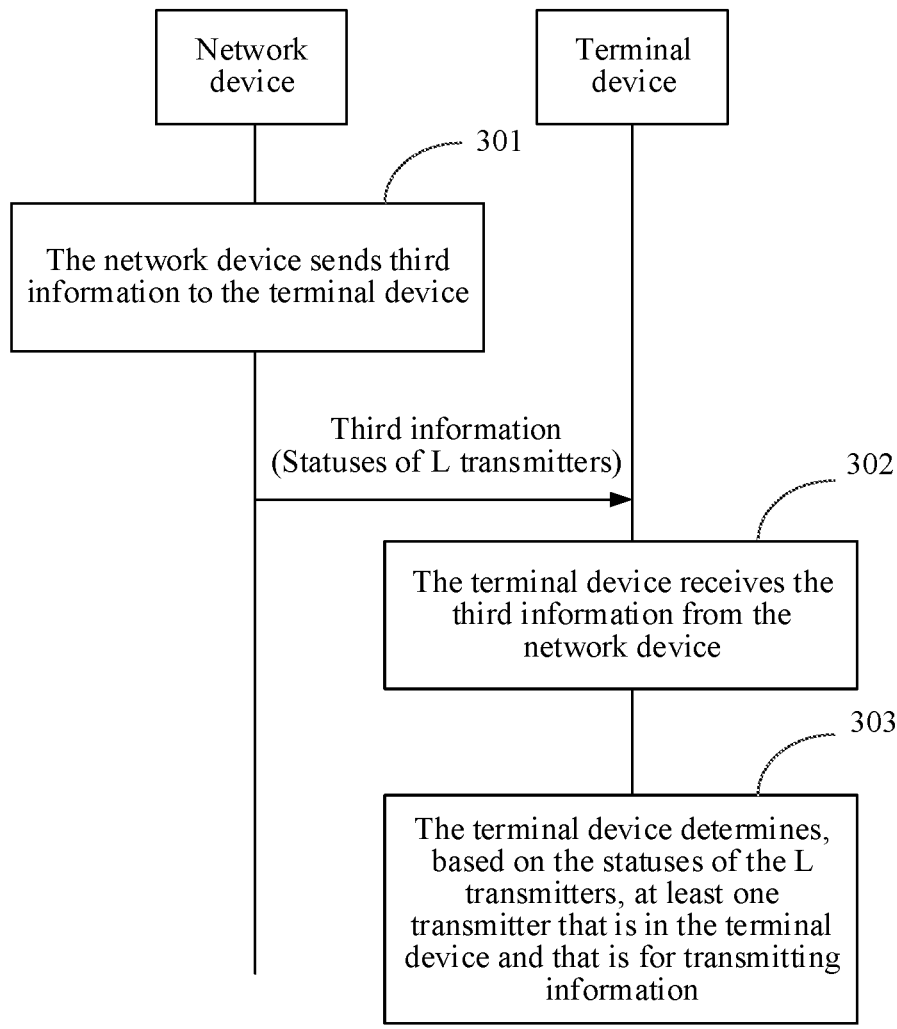
FIG. 3 is a schematic flowchart of a communication method according to an embodiment of this application.

FIG. 3 is a schematic flowchart of a communication method according to an embodiment of this application. The method includes the following steps.

Step 301: A network device sends third information to a terminal device.

In this embodiment of this application, the third information is for indicating statuses of L transmitters in the terminal device, and L is an integer greater than 0. Alternatively, in this embodiment of this application, the third information is for indicating a status of a transmitter corresponding to each of at least one carrier in the terminal device. The at least one carrier may be a configured carrier, an activated carrier, or a scheduled carrier. This is not limited in this application.

Specifically, in this application, an activated carrier is used as an example, and the third information is for indicating a status of a transmitter corresponding to each of the at least one activated carrier in the terminal device.

A specific manner in which the network device sends the third information is not limited in this embodiment of this application. For example, the network device may send the third information by using higher layer signaling, or may send the third information by using DCI.

For example, {1T, 1T, 0T} corresponds to 110. When the network device indicates the terminal device to enable 2 transmitters in the terminal device, the sent third information may be 110, and the indicated first transmitter configuration is {1T, 1T, 0T}, indicating that the TX1 and the TX2 in the terminal device are in an enabled state.

Before this step, optionally, the network device determines the third information. A specific manner in which the network device determines the third information is not limited in this embodiment of this application.

Step 302: The terminal device receives the third information from the network device.

Specifically, in this application, an activated carrier is used as an example, and the third information is for indicating a status of a transmitter corresponding to each of the at least one activated carrier in the terminal device. For example, L=3 activated carriers are configured for the terminal device, and each carrier corresponds to 1 TX.

It should be noted that the terminal device may further receive first information and second information from the network device. For specific content of the first information and the second information, refer to the foregoing descriptions. Details are not described herein again.

For example, the first information is for indicating an antenna port configuration, and the antenna port configuration is an antenna port configuration used by an uplink carrier of the terminal device; or the antenna port configuration is an antenna port configuration used by each uplink carrier configured for the terminal device.

For example, the network device sends second information to the terminal device, where the second information is for indicating whether the uplink carrier is scheduled or whether the uplink carrier is activated.

The network device may send one piece of second information on a downlink carrier corresponding to each uplink carrier, and the second information is for indicating information about the uplink carrier. In this case, the second information may include one or more of the following: an identifier of the uplink carrier; an index of the uplink carrier; a frequency index of the uplink carrier; a frequency identifier of the uplink carrier; whether the uplink carrier is scheduled; or whether the uplink carrier is activated.

In another possible implementation, the network device may send one piece of second information on one downlink carrier, where the second information is for indicating information about the at least one uplink carrier. This implementation is applicable to a case in which the terminal device supports a quantity of uplink carriers greater than a quantity of downlink carriers. In this implementation, the second information may include one or more of the following: identifiers of m uplink carriers, indexes of m uplink carriers, frequency indexes of m uplink carriers, frequency identifiers of m uplink carriers, where m is a positive integer, and m is a quantity of the at least one scheduled uplink carrier, whether the uplink carrier is scheduled, and whether the uplink carrier is activated.

In this implementation, the second information includes A1 bits, and each bit is for indicating whether an uplink carrier is scheduled or activated for use. For example, the network device configures 5 uplink carriers, the second information may include 5 bits, and each bit corresponds to one uplink carrier. It is assumed that when a value of the bit is 1, it indicates that the uplink carrier is scheduled; when the value of the bit is 0, it indicates that the uplink carrier is not scheduled; and when the second information is 11000, it indicates that 2 of the 5 uplink carriers are scheduled. Specifically, numbers may be set for the 5 carriers. For example, the 2 uplink carriers are respectively a first carrier CC1 and a second carrier CC2 that are scheduled.

Optionally, step 303: The terminal device determines, based on the statuses of the L transmitters, at least one transmitter that is in the terminal device and that is for transmitting information.

In this embodiment of this application, the third information is for indicating the statuses of the L transmitters in the terminal device, and L is an integer greater than 0.

Specifically, the third information may be for indicating that each of the L transmitters is in an enabled state or a disabled state; or the third information is for indicating a transmitter in an enabled state in the L transmitters; or the third information is for indicating a transmitter in a disabled state in the L transmitters.

In this embodiment of this application, the at least one transmitter for transmitting information may be determined in a plurality of implementations, which are separately described below.

Implementation 1:

The terminal device determines, based on the third information and the second information, the status of the transmitter corresponding to each of the at least one uplink carrier indicated by the second information, to determine the at least one transmitter that is in the terminal device and that is for transmitting information.

Specifically, the terminal device may determine, based on the statuses of the L transmitters, a transmitter corresponding to each of the at least one uplink carrier, and determine a transmitter in an enabled state corresponding to the at least one uplink carrier as the at least one transmitter for transmitting information.

For example, L=3 activated carriers are configured for the terminal device, and each carrier corresponds to 1 TX. Actually, the network device configures only 2 carriers for the terminal device to perform data concurrency. The terminal device obtains the statuses of the 3 transmitters based on the third information. The terminal device obtains, based on the second information, information of the activated carrier that is actually scheduled, that is, two of the 3 carriers are for actually sending information. Therefore, a status of a transmitter corresponding to each of the three uplink carriers is determined based on the third information and the second information, so that the at least one transmitter that is in the terminal device and that is for transmitting information can be determined.

Specifically, the terminal device may determine, based on the statuses of the 3 transmitters, a transmitter corresponding to each of the at least one uplink carrier, and determine a transmitter in an enabled state corresponding to the at least one uplink carrier as the at least one transmitter for transmitting information.

Implementation 2:

The terminal device may determine, based on the third information and the first information, a status of a transmitter corresponding to each antenna port of the at least one antenna port, to determine the at least one transmitter that is in the terminal device and that is for transmitting information.

Specifically, the terminal device may determine, based on the third information, a transmitter in an enabled state in the L transmitters, and determine, based on the first information, a transmitter corresponding to each of the at least one antenna port, to determine a transmitter in an enabled state corresponding to the at least one antenna port as the at least one transmitter for transmitting information.

For example, L=3 activated carriers are configured for the terminal device, and each carrier corresponds to 1 TX. Actually, the network device configures only 2 carriers for the terminal device to perform data concurrency.

The terminal device obtains the statuses of the 3 transmitters based on the third information. That is, the terminal device may determine, based on the third information, transmitters in an enabled state and transmitters in a disabled state in the L transmitters. The terminal device obtains, based on the first information, antenna port configurations corresponding to the 3 carriers. In other words, the terminal device determines a status of a transmitter corresponding to an antenna port of each of the 3 carriers. Therefore, a transmitter in an enabled state corresponding to the at least one antenna port may be determined as the at least one transmitter for transmitting information.

Implementation 3:

In Implementation 3, the third information is for indicating a status of a transmitter corresponding to each of at least one carrier in the terminal device.

Specifically, the network device may send one piece of third information on a downlink carrier corresponding to each uplink carrier. In this case, the third information is further for indicating one or more of the following: a status of a transmitter used by the uplink carrier; and a quantity of transmitters used by the uplink carrier.

Alternatively, the network device may further send one piece of third information on one downlink carrier. In this case, the third information is further for indicating one or more of the following: a status of a transmitter used by each of X uplink carriers; and a quantity of transmitters used by each of the X uplink carriers.

For example, it is assumed that the terminal device includes 3 transmitters, which are respectively represented as a TX1, a TX2, and a TX3, the network device activates three uplink carriers for the terminal device, which are respectively a CC1, a CC2, and a CC3, where the TX1 corresponds to the CC1, the TX2 corresponds to the CC2, and the TX3 corresponds to the CC3. The third information may include 3 bits, and each bit corresponds to one of the transmitters and one of the uplink carriers. It is assumed that when a value of a bit is 1, it indicates that the uplink carrier is scheduled, and a transmitter corresponding to the uplink carrier is in an enabled state; and when a value of a bit is 0, it indicates that the uplink carrier is not scheduled, and a transmitter corresponding to the uplink carrier is in a disabled state. When the third information is 110, it indicates that the TX1 and the TX2 are in an enabled state, and the CC1 and the CC2 are scheduled.

In Implementation 3, the terminal device determines, based on the status of the transmitter used by each of the X uplink carriers, the at least one transmitter that is in the terminal device and that is for transmitting information. Specifically, the terminal device may determine at least one transmitter in an enabled state in the L transmitters as the at least one transmitter that is in the terminal device and that is for transmitting information.

Particularly, for a case in which {1PX, 0P, 0P} corresponds to {2T, 0T, 0T}, a manner in which the network device indicates the terminal device to set the first transmitter configuration to {2T, 0T, 0T}, or in other words, a manner in which the terminal device sets the first transmitter configuration to {2T, 0T, 0T} by using an antenna port transmission configuration {1P, 0P, 0P} is described in detail below.

Specifically, the terminal device supports a plurality of transmitters (for example, may support 2 TXs, 3 TXs, or 4 TXs) in sending information on one uplink carrier by using a same antenna port, and in this case, the terminal device may send information by using a transmit power higher than a normal power. In the foregoing case, when configuring the carrier, the network device may indicate the terminal device to send information by using a power higher than the normal power, so as to indicate the terminal device to set the first transmitter configuration to {2T, 0T, 0T}.

Specifically, for example, when reporting the capability information, the terminal device notifies the network device that the terminal device supports sending information through a single port by using 2 TXs, and a transmit power may be supported to be 3 dBm higher than an original normal transmit power 23 dBm. Therefore, the network device may indicate, by using 1 bit, the terminal device to send information on a carrier by using a power higher than a normal transmit power. For example, 1 indicates 26 dBm, and 0 indicates 23 dBm. Therefore, the terminal device is actually indicated to send information on a carrier by using 2 TXs.

Therefore, in all embodiments of this application, the network device indicates the first transmit power to indicate the terminal device to use M TXs to send information on a carrier by using a single antenna port. For specific implementation details, refer to Embodiment 5.

Optionally, the method may further include the following step: After determining the statuses of the L transmitters, the terminal device determines to perform transmitter switching or to skip performing transmitter switching; or the terminal device determines the first transmitter configuration, and determines to perform transmitter switching or to skip performing transmitter switching.

Specifically, the at least one transmitter that is in the terminal device and that is for transmitting information is determined based on the statuses of the L transmitters, that is, the terminal device determines the first transmitter configuration. The terminal device then determines whether transmitter switching needs to be performed. Specifically, if the first transmitter configuration is different from the second transmitter configuration, the terminal device determines to perform transmitter configuration switching. In other words, if a transmitter of the terminal device needs to be switched, a switching time needs to be determined, and then data is sent. If the first transmitter configuration is the same as the second transmitter configuration, the terminal device determines to skip performing transmitter configuration switching, or may determine to keep a current transmitter configuration unchanged. In other words, each transmitter of the terminal device does not need to be switched.

Embodiment 5

Figure 4:
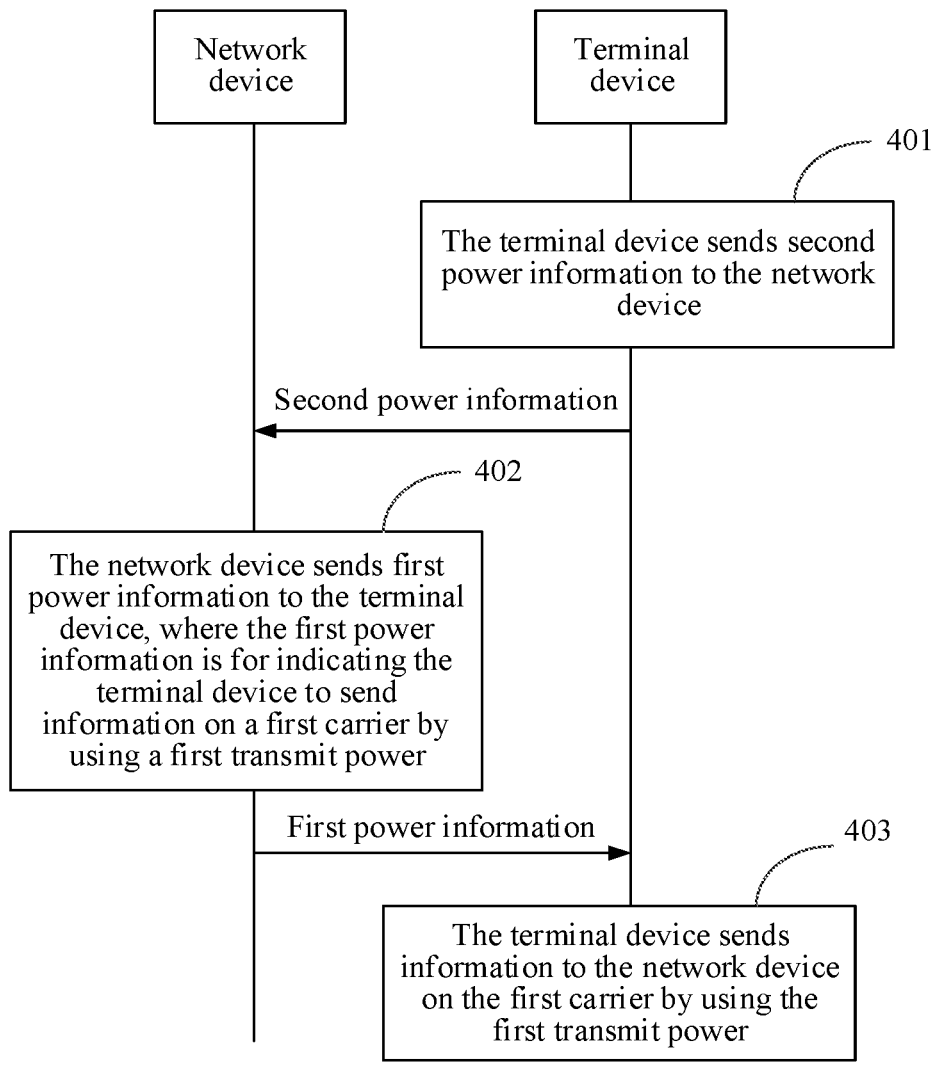
FIG. 4 is a schematic flowchart of a communication method according to an embodiment of this application.

In an embodiment of this application, FIG. 4 is a schematic flowchart of a communication method according to an embodiment of this application. The method includes the following steps.

Step 401: A terminal device sends second power information to a network device.

The second power information is for indicating that the terminal device supports information sending on one antenna port by using a first transmit power or a second transmit power, or the second power information is for indicating that the terminal device supports information sending on one carrier by using a first transmit power or a second transmit power, where the first transmit power is greater than the second transmit power.

"The terminal device supports information sending on one antenna port by using a first transmit power" is specifically for indicating that "the terminal device supports information sending on one antenna port by using K transmitters and by using the first transmit power, where K is a positive integer".

"The terminal device supports sending on one carrier by using a first transmit power" may be specifically for indicating that "the terminal device supports information sending on one carrier on one antenna port by using K transmitters and by using the first transmit power".

The second power information includes at least one of the following parameters: a carrier frequency band using the first transmit power, a carrier frequency using the first transmit power, a carrier frequency index using the first transmit power, a carrier frequency identifier using the first transmit power, a quantity of antenna ports sending information by using the first transmit power, numbers of antenna ports sending information by using the first transmit power, a quantity of transmitters sending information by using the first transmit power, a quantity of multiple-input multiple-output MIMO layers sending information by using the first transmit power, and a power gain.

The power gain may be, for example, 3 dBm. For example, if a normal power is the second transmit power, the first transmit power is a sum of the second transmit power and the power gain.

Therefore, for the foregoing content, the terminal device supports a plurality of transmitters (for example, may support 2 TXs, 3 TXs, or 4 TXs) in sending information on one uplink carrier by using a same antenna port, and in this case, the terminal device may send information by using a transmit power higher than the normal power. When configuring the carrier, if the network device may indicate the terminal device to send information by using a power higher than the normal power, the terminal device is indicated to set the first transmitter configuration to {2T, 0T, 0T} instead of {1T, 0T, 0T}.

Step 402: The network device sends first power information to the terminal device, where the first power information is for indicating the terminal device to send information on a first carrier by using a first transmit power.

The first carrier may be any carrier configured or activated for the terminal device.

Specifically, for a case in which each uplink carrier corresponds to a different downlink carrier, the network device sends the first power information on a downlink carrier 1, to indicate the terminal device to send information on the first carrier by using the first transmit power. In this case, the first carrier may be an uplink carrier corresponding to the downlink carrier sending the first power information.

Specifically, for a case in which 1 downlink carrier may indicate scheduling on a plurality of uplink carriers, the network device sends the first power information on a downlink carrier 1, to indicate the terminal device to send information on the plurality of uplink carriers by using the first transmit power. In this case, the first carrier may be any one of the plurality of uplink carriers.

For example, for a case in which the first power information reported by the terminal device is for indicating that information sending is supported on one carrier by using a single antenna port through 2 TXs, and a transmit power used is the first transmit power, the network device sends the second power information on the downlink carrier 1, and the second power information includes x bits. In this embodiment, 3 bits are used as an example for description. The second power information is for indicating power of three uplink carriers to send information. For example, 100 indicates that an uplink carrier 1 uses the first transmit power to send information, and an uplink carrier 2 and an uplink carrier 3 use the second transmit power to send information.

Therefore, the network device has actually indicated, by using the first power information, the terminal device to use 2 TXs to send information on one carrier by using a single antenna port. Therefore, the terminal device is actually indicated to set the first transmitter configuration to {2T, 0T, 0T} instead of {1T, 0T, 0T}.

Step 403: The terminal device sends information to the network device on the first carrier by using the first transmit power.

The terminal device transmits information on the at least one carrier on one antenna port by using K transmitters and by using the first transmit power.

Alternatively, for an $i^{th}$ carrier in the at least one carrier, the terminal device transmits information on the $i^{th}$ carrier on one antenna port by using K transmitters and by using the first transmit power, where i is a positive integer.

Specifically, the terminal device sends information on one carrier on one antenna port by using K transmitters and by using the second transmit power, where K is a positive integer. For example, K=2 indicates that the terminal device sends data of a carrier (for example, a carrier 1) by using 2 TXs, and the data of the carrier 1 is sent on one antenna port.

For example, for a case in which the first power information reported by the terminal device is for indicating that information sending is supported on one carrier by using a single antenna port through 2 TXs, and a transmit power used is the first transmit power, the network device sends the second power information on the downlink carrier 1, and the second power information includes x bits. In this embodiment, content of the present invention is described by using 3 bits as an example. The second power information is for indicating power of three uplink carriers to send information. For example, 100 indicates that an uplink carrier 1 uses the first transmit power to send information, and an uplink carrier 2 and an uplink carrier 3 use the second transmit power to send information.

The terminal device receives the second power information, and the terminal device sends information on one carrier by using a single antenna port through 2 TXs, where a transmit power is the first transmit power. In other words, the terminal device sets the first transmitter configuration to {2T, 0T, 0T} instead of {1T, 0T, 0T}.

Specific values of the first transmit power and the second transmit power are not limited in embodiments of this application. For example, the first transmit power is 26 dBm, and the second transmit power is 23 dBm.

"The terminal device transmits information on the at least one carrier on one antenna port by using K transmitters and by using the first transmit power". Specifically, the network device indicates power of 5 carriers for sending, where the second carrier and the fifth carrier in the 5 carriers need to perform sending by using a first power, and other carriers perform sending by using a second power. In this case, the terminal device sends information on one antenna port by using the K transmitters and by using the first transmit power on the second carrier, and the terminal device sends an information on one antenna port by using the K transmitters and by using the first transmit power on the fifth carrier. "The terminal device transmits information on the at least one carrier on one antenna port by using K transmitters and by using the first transmit power" specifically means that the terminal device sends information on one antenna port by using the K transmitters and by using the first transmit power on the second carrier, and the terminal device sends an information on one antenna port by using the K transmitters and by using the first transmit power on the fifth carrier.

Embodiment 6

Step 1: A terminal device sends a first capability message to a network device.

The first capability message may include at least one of capability information and first power information.

The capability information is for indicating one or more of the following:

The terminal device can determine, from more than L uplink carriers, an uplink carrier for sending information, where L is an integer greater than 0; and the terminal device can support determining, from a maximum of S uplink carriers, an uplink carrier for sending information, where S is a positive integer greater than L, and L.

The first power information: Specifically, the first power information is for indicating that the terminal device supports information sending on one antenna port by using a first transmit power or a second transmit power, where the first transmit power is greater than the second transmit power. Alternatively, a terminal device sends first power information to a network device, where the first power information is for indicating that the terminal device supports information sending on one carrier by using a first transmit power or a second transmit power, where the first transmit power is greater than the second transmit power. "The terminal device supports information sending on one antenna port by using a first transmit power" is specifically for indicating that the terminal device supports information sending on one antenna port by using K transmitters and by using the first transmit power, where K is a positive integer.

"The terminal device supports sending on one carrier by using a first transmit power" may be specifically for indicating that the terminal device supports information sending on one carrier on one antenna port by using K transmitters and by using the first transmit power, where K is a positive integer.

The second power information includes at least one of the following parameters: a carrier frequency band using the first transmit power, a carrier frequency using the first transmit power, a carrier frequency index using the first transmit power, a carrier frequency identifier using the first transmit power, a quantity of antenna ports sending information by using the first transmit power, numbers of antenna ports sending information by using the first transmit power, a quantity of transmitters sending information by using the first transmit power, a quantity of multiple-input multiple-output MIMO layers sending information by using the first transmit power, and a power gain.

The power gain may be, for example, 3 dBm. For example, if a normal power is the second transmit power, the first transmit power is a sum of the second transmit power and the power gain.

Therefore, for the foregoing content, the terminal device supports a plurality of transmitters in sending information on one uplink carrier by using a same antenna port, and in this case, the terminal device may send information by using a transmit power higher than the normal power. When configuring the carrier, if the network device may indicate the terminal device to send information by using a power higher than the normal power, the terminal device is indicated to set the first transmitter configuration to {2T, 0T, 0T} instead of {1T, 0T, 0T}.

Step 2: The network device sends configuration information to the terminal device.

The configuration information is for indicating one or more of the following:

information about an uplink carrier configured by the network device for the terminal device;

information about an uplink carrier activated by the network device for the terminal device;

information about an uplink carrier used by the terminal device to transmit information;

a quantity X of uplink carriers configured by the network device for the terminal device, where X is a positive integer greater than L, and L is a maximum quantity of uplink carriers on which the terminal device can perform uplink transmission simultaneously;

a quantity X of uplink carriers configured by the network device for the terminal device, where X is a positive integer greater than P, P is a maximum quantity of transmitters on which the terminal device can perform uplink transmission simultaneously; or a quantity m of uplink carriers used by the terminal device to transmit information, where m is a positive integer less than or equal to L.

The information about an uplink carrier may be at least one of the following: an identifier of the uplink carrier, an index of the uplink carrier, a frequency of the uplink carrier, a frequency index of the uplink carrier, a frequency identifier of the uplink carrier, or the like.

For a carrier: "an uplink carrier configured by the network device for the terminal device" indicates that the terminal device has performed one or more of adjustment such as synchronization, measurement, and power control on the carrier. This type of carrier may also be referred to as that the carrier is configured, or one carrier is configured. In this case, that is to say, the carrier is a configured carrier. Certainly, the carrier may alternatively be referred to as another name. This is not limited in this application.

"An uplink carrier activated by the network device for the terminal device" indicates that the terminal device may send information on the carrier at any time, or may perform communication on the carrier at any time. In this case, it may be said that the carrier is activated, or a carrier is activated, or the carrier may be referred to as an activated carrier. Certainly, the carrier may alternatively be referred to as another name. This is not limited in this application.

"Information about an uplink carrier used by the terminal device to transmit information" indicates that the terminal device sends information on the carrier, or may perform communication on the carrier. In this case, it may also be said that the carrier is scheduled, or one carrier is scheduled. In this case, the carrier may also be referred to as a scheduled carrier. Certainly, the carrier may alternatively be referred to as another name. This is not limited in this application.

Specifically, for example, the network device configures 5 carriers for the terminal device, and activates 3 carriers thereof, so that the terminal can use the carriers for communication at any time. However, during actual scheduling, the network device actually uses only 2 carriers of the 3 carriers for communication. It should be noted that the 3 carriers are a maximum quantity of parallel sending uplink carriers supported by UE, or in other words, the 3 carriers are a maximum quantity of TX transmitters that can be supported by the terminal device.

Step 3: The network device sends third information to the terminal device.

In this embodiment of this application, the third information is for indicating a status of a transmitter corresponding to each of at least one carrier in the terminal device. The at least one carrier may be a configured carrier, an activated carrier, or a scheduled carrier. This is not limited in this application.

Specifically, in this application, an activated carrier is used as an example, and the third information is for indicating a status of a transmitter corresponding to each of the at least one activated carrier in the terminal device.

Specifically, a specific manner in which the network device sends the third information is not limited in this embodiment of this application. For example, the network device may send the third information by using higher layer signaling.

For example, L=3 and m=2 are used as an example. That is, the terminal device has 3 TX channels, the network device configures 3 activated carriers for transmitting data, and each carrier corresponds to 1 TX. However, 2 of the carriers are actually scheduled to transmit data: The third information may indicate, by using X bits, a status of a transmitter corresponding to each of the at least one carrier in the terminal device. Specifically, the third information may be 110, and the indicated first transmitter configuration is {1T, 1T, 0T}, indicating that the TX1 and the TX2 in the terminal device are in an enabled state.

Step 4: The terminal device receives at least one of the third information and first power information from the network device.

The third information is for indicating a status of a transmitter corresponding to each of the at least one carrier in the terminal device. The at least one carrier may be a configured carrier, an activated carrier, or a scheduled carrier. This is not limited in this application.

For example, L=3 and m=2 are used as an example. That is, the terminal device has 3 TX channels, the network device configures 3 activated carriers for transmitting data, and each carrier corresponds to 1 TX. However, 2 of the carriers are actually scheduled to transmit data: The third information may indicate, by using X bits, a status of a transmitter corresponding to each of the at least one carrier in the terminal device. Specifically, the third information may be 110, and the indicated first transmitter configuration is {1T, 1T, 0T}, indicating that the TX1 and the TX2 in the terminal device are in an enabled state.

The first power information is for indicating the terminal device to send information on a first carrier by using the first transmit power.

Specifically, for a case in which each uplink carrier corresponds to a different downlink carrier, the network device sends the first power information on a downlink carrier 1, to indicate the terminal device to send information on the first carrier by using the first transmit power. Alternatively, specifically, for a case in which 1 downlink carrier may indicate scheduling on a plurality of uplink carriers, the network device sends the first power information on a downlink carrier 1, to indicate the terminal device to send information on the plurality of uplink carriers by using the first transmit power.

For example, for a case in which the second power information reported by the terminal device is for indicating that information sending is supported on one carrier by using a single antenna port through 2 TXs, and a transmit power used is the first transmit power, the network device sends the first power information on the downlink carrier 1, and the first power information includes x bits. In this embodiment, content of the present invention is described by using 3 bits as an example. The first power information is for indicating power of three uplink carriers to send information. For example, 100 indicates that an uplink carrier 1 uses the first transmit power to send information, and an uplink carrier 2 and an uplink carrier 3 use the second transmit power to send information.

Therefore, the network device has actually indicated, by using the second power information, the terminal device to use 2 TXs to send information on one carrier by using a single antenna port. Therefore, the terminal device is actually indicated to set the first transmitter configuration to {2T, 0T, 0T} instead of {1T, 0T, 0T}.

Particularly, introduction of the second power information is described:

For a case in which {1PX, 0P, 0P} corresponds to {2T, 0T, 0T}, a manner in which the network device indicates the terminal device to set the first transmitter configuration to {2T, 0T, 0T}, or in other words, a manner in which the terminal device sets the first transmitter configuration to {2T, 0T, 0T} by using an antenna port transmission configuration {1P, 0P, 0P}.

Specifically, the terminal device supports a plurality of transmitters in sending information on one uplink carrier by using a same antenna port, and in this case, the terminal device may send information by using a transmit power higher than a normal power. In the foregoing case, when configuring the carrier, the network device may indicate the terminal device to send information by using a power higher than the normal power, so as to indicate the terminal device to set the first transmitter configuration to {2T, 0T, 0T}.

Specifically, for example, when reporting the capability information, the terminal device notifies the network device that the terminal device supports sending information through a single port by using 2 TXs, and a transmit power may be supported to be 3 dBm higher than an original normal transmit power 23 dBm. Therefore, the network device may indicate, by using 1 bit, the terminal device to send information on a carrier by using a power higher than a normal transmit power. For example, 1 indicates 26 dBm, and 0 indicates 23 dBm. Therefore, the terminal device is actually indicated to send information on a carrier by using 2 TXs.

Therefore, in all embodiments of this application, the network device indicates the first transmit power to indicate the terminal device to use M TXs to send information on a carrier by using a single antenna port. For specific implementation details, refer to Embodiment 5.

Optionally, step 5: The terminal device determines, based on statuses of L transmitters, at least one transmitter that is in the terminal device and that is for transmitting information.

Specifically, the third information is for indicating a status of a transmitter corresponding to each of the at least one carrier in the terminal device. Therefore, the terminal determines, based on the third information, the status of the transmitter corresponding to each of L carriers.

The following content is the same as the content in the implementation 3 of step 303 in Embodiment 5.

Specifically, the network device may send one piece of third information on a downlink carrier corresponding to each uplink carrier. In this case, the third information is further for indicating one or more of the following: a status of a transmitter used by the uplink carrier; and a quantity of transmitters used by the uplink carrier.

Alternatively, the network device may further send one piece of third information on one downlink carrier. In this case, the third information is further for indicating one or more of the following: a status of a transmitter used by each of X uplink carriers; and a quantity of transmitters used by each of the X uplink carriers.

For example, L=3 and m=2 are used as an example. The terminal device includes 3 transmitters, which are respectively represented as a TX1, a TX2, and a TX3, and the network device activates three uplink carriers for the terminal device, which are respectively a CC1, a CC2, and a CC3, where the TX1 corresponds to the CC1, the TX2 corresponds to the CC2, and the TX3 corresponds to the CC3. The third information may include 3 bits, and each bit corresponds to one of the transmitters and one of the uplink carriers. It is assumed that when a value of a bit is 1, it indicates that the uplink carrier is scheduled, and a transmitter corresponding to the uplink carrier is in an enabled state; and when a value of a bit is 0, it indicates that the uplink carrier is not scheduled, and a transmitter corresponding to the uplink carrier is in a disabled state. When the third information is 110, it indicates that the TX1 and the TX2 are in an enabled state, and the CC1 and the CC2 are scheduled. When the third information is 100, it indicates that the TX1 is in an enabled state, and the CC 1 is scheduled for transmission. The CC2 and the CC3 are not scheduled, and are not for transmitting information.

The terminal device determines, based on the status of the transmitter used by each of the X uplink carriers, the at least one transmitter that is in the terminal device and that is for transmitting information. Specifically, the terminal device may determine at least one transmitter in an enabled state in the L transmitters as the at least one transmitter that is in the terminal device and that is for transmitting information.

Particularly, the terminal device may determine, based on the first power information, a quantity of TXs used on each carrier.

Step 6: After determining the statuses of the L transmitters, the terminal device determines to perform transmitter switching or to skip performing transmitter switching; or the terminal device determines the first transmitter configuration, and determines to perform transmitter switching or to skip performing transmitter switching.

Specifically, the at least one transmitter that is in the terminal device and that is for transmitting information is determined based on the statuses of the L transmitters, that is, the terminal device determines the first transmitter configuration. The terminal device then determines whether transmitter switching needs to be performed. Specifically, if the first transmitter configuration is different from the second transmitter configuration, the terminal device determines to perform transmitter configuration switching. In other words, if a transmitter of the terminal device needs to be switched, a switching time needs to be determined, and then data is sent. If the first transmitter configuration is the same as the second transmitter configuration, the terminal device determines to skip performing transmitter configuration switching, or may determine to keep a current transmitter configuration unchanged. In other words, each transmitter of the terminal device does not need to be switched.

Embodiments described in this specification may be independent solutions, or may be combined based on internal logic. All these solutions fall within the protection scope of this application.

It may be understood that, in the foregoing method embodiments, the methods and the operations implemented by the terminal device may alternatively be implemented by a component (for example, a chip or a circuit) used in the terminal device, and the methods and the operations implemented by the network device may alternatively be implemented by a component (for example, a chip or a circuit) used in the network device.

In the foregoing embodiments provided in this application, the methods provided in embodiments of this application are separately described from a perspective of interaction between devices. To implement functions in the foregoing methods provided in embodiments of this application, the terminal device and the network device may include a hardware structure and/or a software module, and implement the foregoing functions in a form of a hardware structure, a software module, or a combination of a hardware structure and a software module. Whether one of the foregoing functions is performed in the form of a hardware structure, a software module, or a hardware structure and a software module depends on a specific application and design constraints of the technical solutions.

In embodiments of this application, module division is an example, and is merely logical function division. During actual implementation, another division manner may be used. In addition, functional modules in embodiments of this application may be integrated into one processor, or each of the modules may exist alone physically, or two or more modules are integrated into one module. The integrated module may be implemented in a form of hardware, or may be implemented in a form of a software functional module.

Figure 5:
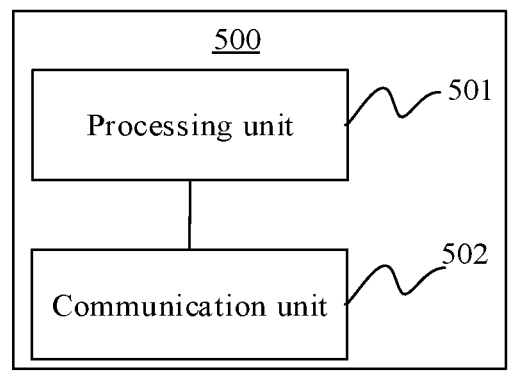
FIG. 5 is a schematic diagram of a structure of a communication apparatus according to an embodiment of this application.

Same as the foregoing concept, as shown in FIG. 5, an embodiment of this application further provides an apparatus 500 configured to implement functions of the terminal device or the network device in the foregoing methods. For example, the apparatus may be a software module or a chip system. In embodiments of this application, the chip system may include a chip, or may include a chip and another discrete component. The apparatus 500 may include a processing unit 501 and a communication unit 502.

In embodiments of this application, the communication unit may also be referred to as a transceiver unit, and may include a sending unit and/or a receiving unit, which are respectively configured to perform sending and receiving steps of the terminal device or the network device in the foregoing method embodiments.

Figure 6:
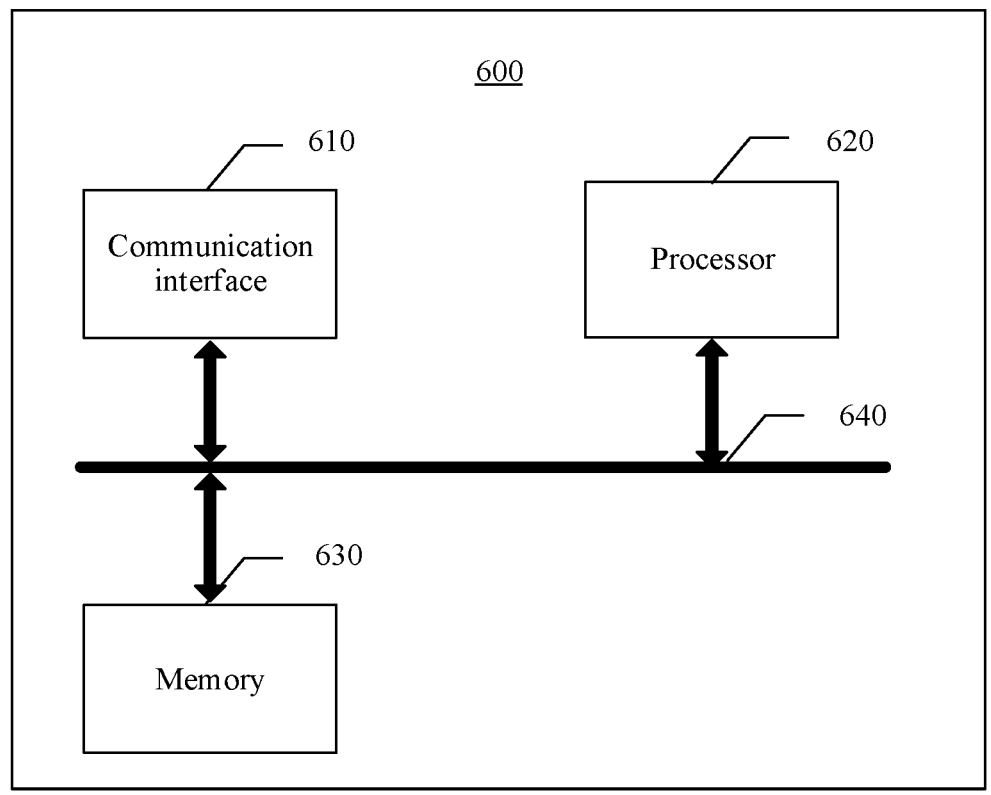
FIG. 6 is a schematic diagram of a structure of a communication apparatus according to an embodiment of this application.

The following describes in detail communication apparatuses provided in embodiments of this application with reference to FIG. 5 and FIG. 6. It should be understood that descriptions of apparatus embodiments correspond to the descriptions of the method embodiments. Therefore, for content that is not described in detail, refer to the foregoing method embodiments. For brevity, details are not described herein again.

In a possible design, the apparatus 500 may implement steps or procedures correspondingly performed by the terminal device or the network device in the foregoing method embodiments. Descriptions are separately provided below For example, when the apparatus 500 implements the functions of the terminal device in embodiments of this application:

the communication unit is configured to receive first information from a network device, where the first information is for indicating an antenna port configuration used by an uplink carrier; and the processing unit is configured to determine statuses of L transmitters in the terminal device based on the antenna port configuration, where L is an integer greater than 0.

In a possible implementation, the processing unit is specifically configured to:

determine at least one uplink carrier, where the at least one uplink carrier is for transmitting information or the at least one uplink carrier is an uplink carrier scheduled for use by the terminal device;

determine an antenna port transmission configuration based on the at least one uplink carrier and the antenna port configuration, where the antenna port transmission configuration is for indicating an antenna port corresponding to the at least one uplink carrier; and determine the statuses of the L transmitters based on the antenna port transmission configuration.

In a possible implementation, the processing unit is further specifically configured to:

if a first transmitter configuration is different from a second transmitter configuration, determine to perform transmitter configuration switching; or if a first transmitter configuration is different from a second transmitter configuration, determine to skip performing transmitter configuration switching, where the second transmitter configuration is statuses of the L transmitters when or before the terminal device receives the first information, and the first transmitter configuration is statuses of the L transmitters determined based on the antenna port configuration.

In a possible implementation, the antenna port transmission configuration corresponds to one or a plurality of transmitter configurations; and the processing unit is specifically configured to: if the antenna port transmission configuration corresponds to only one transmitter configuration, determine the transmitter configuration corresponding to the antenna port transmission configuration as a first transmitter configuration;

if the antenna port transmission configuration corresponds to a plurality of transmitter configurations, and the plurality of transmitter configurations include a second transmitter configuration, determine the second transmitter configuration as a first transmitter configuration; or if the antenna port transmission configuration corresponds to a plurality of transmitter configurations, and the plurality of transmitter configurations do not include a second transmitter configuration, select one transmitter configuration from the plurality of transmitter configurations corresponding to the antenna port transmission configuration as a first transmitter configuration, where the second transmitter configuration is a transmitter configuration used when or before the terminal device receives the first information.

In a possible implementation, the processing unit is specifically configured to:

determine, from at least one transmitter configuration in a preset sequence, a transmitter configuration that meets a condition, and use the transmitter configuration that meets the condition as the first transmitter configuration, where the at least one transmitter configuration is determined based on the L transmitters of the terminal device; and the transmitter configuration that meets the condition means that one or a plurality of antenna port configurations corresponding to the transmitter configuration include the antenna port transmission configuration.

In a possible implementation, the second transmitter configuration is located in a first group of transmitter configurations of N groups of transmitter configurations, and the first group of transmitter configurations includes at least one transmitter configuration; and the processing unit is specifically configured to: if determining that a transmitter configuration that meets a condition exists in the first group of transmitter configurations, use the transmitter configuration that meets the condition as the first transmitter configuration; or if determining that a transmitter configuration that meets a condition does not exist in the first group of transmitter configurations, determine, from the N groups of transmitter configurations in a preset sequence, the transmitter configuration that meets the condition, and use the transmitter configuration that meets the condition as the first transmitter configuration, where the transmitter configuration that meets the condition means that one or a plurality of antenna port configurations corresponding to the transmitter configuration include the antenna port transmission configuration.

For example, when the apparatus 500 implements the functions of the network device in embodiments of this application:

the communication unit is configured to send first information to a terminal device, where the first information is for indicating an antenna port configuration used by an uplink carrier; and the processing unit is configured to determine statuses of L transmitters in the terminal device based on the antenna port configuration, where L is an integer greater than 0.

For example, when the apparatus 500 implements the functions of the terminal device in embodiments of this application:

the communication unit is configured to receive third information from a network device, where the third information is for indicating a status of a transmitter corresponding to each of at least one carrier; and the processing unit is configured to determine, based on the status of the transmitter corresponding to each of the at least one carrier, at least one transmitter that is in the terminal device and that is for transmitting information.

For example, when the apparatus 500 implements the functions of the network device in embodiments of this application:

the communication unit is configured to send third information to a terminal device, where the third information is for indicating statuses of L transmitters in the terminal device, or the third information is for indicating a status of a transmitter corresponding to each of at least one carrier; and the processing unit is configured to receive information on the at least one carrier.

For example, when the apparatus 500 implements the functions of the terminal device in embodiments of this application:

the communication unit is configured to receive third information from a network device, where the third information is for indicating statuses of L transmitters in a terminal device, and L is an integer greater than 0; and the processing unit is configured to determine, based on the statuses of the L transmitters, at least one transmitter that is in the terminal device and that is for transmitting information.

For example, when the apparatus 500 implements the functions of the terminal device in embodiments of this application:

the processing unit is configured to receive, by using the communication unit, first power information from a network device, where the first power information is for indicating that a transmit power of at least one carrier is a first transmit power; and the processing unit is configured to transmit, by using the communication unit, information on the at least one carrier by using the first transmit power.

FIG. 6 is a schematic diagram of a communication structure according to an embodiment of this application. The apparatus shown in FIG. 6 may be an implementation of a hardware circuit of the apparatus shown in FIG. 5. The communication apparatus is applicable to performing functions of the terminal device or the network device in the foregoing method embodiments. For ease of description, FIG. 6 shows only main components of the communication apparatus.

The apparatus 600 shown in FIG. 6 includes at least one processor 620, a communication interface 610, and a memory 630. The processor 620 is configured to execute instructions or a program stored in the memory 630. When the instructions or the program stored in the memory 630 is executed, the processor 620 is configured to perform an operation performed by the processing unit 501 in the foregoing embodiment, and the communication interface 610 is configured to perform an operation performed by the communication unit 502 in the foregoing embodiment.

The memory 630 is configured to store program instructions and/or data. The memory 630 is coupled to the processor 620. The coupling in this embodiment of this application is indirect coupling or a communication connection between apparatuses, units, or modules for information exchange between the apparatuses, the units, or the modules, and may be in electrical, mechanical, or other forms. The processor 620 may operate with the memory 630. The processor 620 may execute the program instructions stored in the memory 630. At least one of the at least one memory may be included in the processor.

In an implementation process, the steps in the foregoing methods can be implemented by using a hardware integrated logic circuit in the processor, or by using instructions in a form of software. The steps of the methods disclosed with reference to embodiments of this application may be performed by a hardware processor, or may be performed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that, the processor in this embodiment of this application may be an integrated circuit chip, and has a signal processing capability. In an implementation process, the steps in the foregoing method embodiments can be implemented by using a hardware integrated logic circuit in the processor, or by using instructions in a form of software. The processor may be a general purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, or a discrete hardware component.

It may be understood that the memory in embodiments of this application may be a volatile memory or a non-volatile memory, or may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. It should be noted that the memory in the systems and methods described in this specification includes but is not limited to these and any memory of another appropriate type.

The apparatus 600 may further include a communication interface 610, configured to communicate with another device by using a transmission medium, so that an apparatus in the apparatus 600 may communicate with the another device. In this embodiment of this application, the communication interface may be a transceiver, a circuit, a bus, a module, or a communication interface of another type. In this embodiment of this application, when the communication interface is a transceiver, the transceiver may include an independent receiver and an independent transmitter, or may be a transceiver integrated with a transceiver function, or may be an interface circuit.

The apparatus 600 may further include a communication line 640. The communication interface 610, the processor 620, and the memory 630 may be connected to each other through the communication line 640. The communication line 640 may be a peripheral component interconnect (peripheral component interconnect, PCI for short) bus, an extended industry standard architecture (extended industry standard architecture, EISA for short) bus, or the like. The communication line 640 may be classified into an address bus, a data bus, a control bus, and the like. For ease of representation, only one bold line is used for representation in FIG. 6, but this does not mean that there is only one bus or only one type of bus.

A person skilled in the art should understand that embodiments of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a magnetic disk memory, an optical memory, and the like) that include computer-usable program code.

This application is described with reference to the flowcharts and/or block diagrams of the method, the device (system), and the computer program product according to this application. It should be understood that computer program instructions may be used for implementing each procedure and/or each block in the flowcharts and/or the block diagrams and a combination of a procedure and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

It is clear that a person skilled in the art can make various modifications and variations to this application without departing from the scope of this application. This application is intended to cover these modifications and variations of this application provided that the modifications and the variations fall within the scope of the claims of this application and their equivalent technologies.

What is claimed is:

1. A communication method performed by a terminal device or a chip in a terminal device, comprising:
   receiving first information from a network device, wherein the first information indicates an antenna port configuration used by an uplink carrier;
   determining statuses of L transmitters in the terminal device based on the antenna port configuration, wherein L is an integer greater than 0; and
   sending second power information to the network device, wherein the second power information indicates that the terminal device supports both a first transmit power and a second transmit power for information transmission on at least one of one antenna port or one carrier, and the first transmit power is greater than the second transmit power.

2. The method according to claim 1, wherein the determining, statuses of L transmitters in the terminal device based on the antenna port configuration comprises:
   determining at least one uplink carrier, wherein the at least one uplink carrier is for transmitting information or the at least one uplink carrier is an uplink carrier scheduled for use by the terminal device;
   determining an antenna port transmission configuration based on the at least one uplink carrier and the antenna port configuration, wherein the antenna port transmission configuration indicates an antenna port corresponding to the at least one uplink carrier; and
   determining the statuses of the L transmitters based on the antenna port transmission configuration.

3. The method according to claim 2, wherein the antenna port transmission configuration corresponds to one or a plurality of transmitter configurations; and
   the determining the statuses of the L transmitters based on the antenna port transmission configuration comprises:
   based on the antenna port transmission configuration corresponding to only one transmitter configuration, determining the transmitter configuration corresponding to the antenna port transmission configuration as a first transmitter configuration;
   based on the antenna port transmission configuration corresponding to a plurality of transmitter configurations, and the plurality of transmitter configurations comprise a second transmitter configuration, determining the second transmitter configuration as a first transmitter configuration; or
   based on the antenna port transmission configuration corresponding to a plurality of transmitter configurations, and the plurality of transmitter configurations do not comprise a second transmitter configuration, selecting one transmitter configuration from the plurality of transmitter configurations corresponding to the antenna port transmission configuration as a first transmitter configuration, wherein
   the second transmitter configuration is a transmitter configuration used when the terminal device receives the first information.

4. The method according to claim 3, wherein the second transmitter configuration is located in a first group of transmitter configurations of N groups of transmitter configurations, and the first group of transmitter configurations comprises at least one transmitter configuration; and
   the selecting one transmitter configuration from the plurality of transmitter configurations corresponding to the antenna port transmission configuration as a first transmitter configuration comprises:

based on a transmitter configuration that meets a condition being determined to exist in the first group of transmitter configurations, using the transmitter configuration that meets the condition as the first transmitter configuration; or based on a transmitter configuration that meets a condition being determined to not exist in the first group of transmitter configurations, determining, from the N groups of transmitter configurations in a preset sequence, the transmitter configuration that meets the condition, and using the transmitter configuration that meets the condition as the first transmitter configuration, wherein the transmitter configuration meeting the condition comprises one or a plurality of antenna port configurations corresponding to the transmitter configuration including the antenna port transmission configuration.

5. The method according to claim 1, wherein the method further comprises:

based on a first transmitter configuration being different from a second transmitter configuration, determining to perform transmitter configuration switching; or based on a first transmitter configuration is different from a second transmitter configuration, determining to skip performing transmitter configuration switching, wherein the second transmitter configuration is statuses of the L transmitters when the terminal device receives the first information, and the first transmitter configuration is statuses of the L transmitters determined based on the antenna port configuration.

6. The method according to claim 1, wherein the method further comprises:

receiving third information from the network device, wherein the third information indicates the statuses of the L transmitters in the terminal device, and L is an integer greater than 0; or the third information indicates a status of a transmitter corresponding to each of at least one carrier in the terminal device;

sending fifth information to the network device, wherein the fifth information indicates the statuses of the L transmitters in the terminal device, and L is an integer greater than 0; or the fifth information indicates a status of a transmitter corresponding to each of at least one carrier in the terminal device; or setting the statuses of the L transmitters to pre-configured statuses.

7. The method according to claim 1, wherein the method further comprises:

receiving first power information from the network device, wherein the first power information indicates that a transmit power of at least one carrier is a first transmit power; and transmitting information on the at least one carrier by using the first transmit power.

8. The method according to claim 1, further comprising:

receiving first power information from the network device, wherein the first power information indicates that a transmit power of at least one carrier is a first transmit power; and transmitting information on the at least one carrier by using the first transmit power.

9. A communication method performed by a network device or a chip in a network device, comprising:

sending first information to a terminal device, wherein the first information indicates an antenna port configuration used by an uplink carrier;

determining statuses of L transmitters in the terminal device based on the antenna port configuration, wherein L is an integer greater than 0; and receiving second power information from the terminal device, wherein the second power information indicates that the terminal device supports both a first transmit power and a second transmit power for information transmission on at least one of one antenna port or one carrier, and the first transmit power is greater than the second transmit power.

10. The method according to claim 9, further comprising:

sending first power information to the terminal device, wherein the first power information indicates that a transmit power of at least one carrier is a first transmit power.

11. A communication apparatus being a terminal device or a chip in a terminal device, comprising:

one or more non-transitory memory storage comprising instructions; and one or more processors in communication with the one or more memory storage, wherein the instructions, when executed by the one or more processors, cause the apparatus to:

receive first information from a network device, wherein the first information indicates an antenna port configuration used by an uplink carrier;

determine statuses of L transmitters in the terminal device based on the antenna port configuration, wherein L is an integer greater than 0; and send second power information to the network device, wherein the second power information indicates that the terminal device supports both a first transmit power and a second transmit power for information transmission on at least one of one antenna port or one carrier, and the first transmit power is greater than the second transmit power.

12. The apparatus according to claim 11, wherein the instructions, when executed by the one or more processors, further cause the apparatus to:

determine at least one uplink carrier, wherein the at least one uplink carrier is for transmitting information or the at least one uplink carrier is an uplink carrier scheduled for use by the terminal device;

determine an antenna port transmission configuration based on the at least one uplink carrier and the antenna port configuration, wherein the antenna port transmission configuration indicates an antenna port corresponding to the at least one uplink carrier; and determine the statuses of the L transmitters based on the antenna port transmission configuration.

13. The apparatus according to claim 12, wherein the antenna port transmission configuration corresponds to one or a plurality of transmitter configurations; and the instructions, when executed by the one or more processors, further cause the apparatus to:

based on the antenna port transmission configuration corresponding to only one transmitter configuration, determine the transmitter configuration corresponding to the antenna port transmission configuration as a first transmitter configuration;

based on the antenna port transmission configuration corresponding to a plurality of transmitter configurations, and the plurality of transmitter configurations comprise a second transmitter configuration, determine the second transmitter configuration as a first transmitter configuration; or based on the antenna port transmission configuration corresponding to a plurality of transmitter configurations, and the plurality of transmitter configurations do not comprise a second transmitter configuration, select one transmitter configuration from the plurality of transmitter configurations corresponding to the antenna port transmission configuration as a first transmitter configuration, wherein the second transmitter configuration is a transmitter configuration used when the terminal device receives the first information.

14. The apparatus according to claim 13, wherein the second transmitter configuration is located in a first group of transmitter configurations of N groups of transmitter configurations, and the first group of transmitter configurations comprises at least one transmitter configuration; and the instructions, when executed by the one or more processors, further cause the apparatus to:

based on a transmitter configuration that meets a condition being determined to exist in the first group of transmitter configurations, use the transmitter configuration that meets the condition as the first transmitter configuration; or based on a transmitter configuration that meets a condition being determined to not exist in the first group of transmitter configurations, determine, from the N groups of transmitter configurations in a preset sequence, the transmitter configuration that meets the condition, and use the transmitter configuration that meets the condition as the first transmitter configuration, wherein the transmitter configuration meeting the condition comprises one or a plurality of antenna port configurations corresponding to the transmitter configuration including the antenna port transmission configuration.

15. The apparatus according to claim 11, wherein the instructions, when executed by the one or more processors, further cause the apparatus to:

based on a first transmitter configuration being different from a second transmitter configuration, determine to perform transmitter configuration switching; or based on a first transmitter configuration being different from a second transmitter configuration, determine to skip performing transmitter configuration switching, wherein the second transmitter configuration is statuses of the L transmitters when the communication apparatus receives the first information, and the first transmitter configuration is statuses of the L transmitters determined based on the antenna port configuration.

16. The apparatus according to claim 11, wherein the instructions, when executed by the one or more processors, further cause the apparatus to:

receive third information from the network device, wherein the third information indicates the statuses of the L transmitters in the terminal device, and L is an integer greater than 0; or the third information indicates a status of a transmitter corresponding to each of at least one carrier in the terminal device;

send fifth information to the network device, wherein the fifth information indicates the statuses of the L transmitters in the terminal device, and L is an integer greater than 0; or the fifth information indicates a status of a transmitter corresponding to each of at least one carrier in the terminal device; or set the statuses of the L transmitters to pre-configured statuses.

17. The apparatus according to claim 11, wherein the instructions, when executed by the one or more processors, further cause the apparatus to:

receive first power information from the network device, wherein the first power information indicates that a transmit power of at least one carrier is a first transmit power; and transmit information on the at least one carrier by using the first transmit power.

18. The apparatus according to claim 11, wherein the instructions, when executed by the one or more processors, further cause the apparatus to:

receive first power information from the network device, wherein the first power information indicates that a transmit power of at least one carrier is a first transmit power; and transmit information on the at least one carrier by using the first transmit power.

19. A communication apparatus being a network device or a chip in a network device, comprising:

one or more non-transitory memory storage comprising instructions; and one or more processors in communication with the one or more memory storage, wherein the instructions, when executed by the one or more processors, cause the apparatus to:

send first information to a terminal device, wherein the first information indicates an antenna port configuration used by an uplink carrier;

determine statuses of L transmitters in the terminal device based on the antenna port configuration, wherein L is an integer greater than 0; and receive second power information from the terminal device, wherein the second power information indicates that the terminal device supports both a first transmit power and a second transmit power for information transmission on at least one of one antenna port or one carrier, and the first transmit power is greater than the second transmit power.

20. The apparatus according to claim 19, wherein the instructions, when executed by the one or more processors, further cause the apparatus to:

send first power information to the terminal device, wherein the first power information indicates that a transmit power of at least one carrier is a first transmit power.

* * * * *